United States Patent [19]

Washisu

[11] Patent Number: 5,266,988

[45] Date of Patent: Nov. 30, 1993

[54] IMAGE SHAKE SUPPRESSING DEVICE FOR CAMERA

[75] Inventor: Koichi Washisu, Tokyo, Japan

[73] Assignee: Canon Kabushiki Kaisha, Tokyo, Japan

[21] Appl. No.: 912,572

[22] Filed: Jul. 13, 1992

Related U.S. Application Data

[63] Continuation of Ser. No. 626,985, Dec. 13, 1990, abandoned.

[30] Foreign Application Priority Data

Dec. 18, 1989 [JP] Japan ................... 1-327571
Dec. 18, 1989 [JP] Japan ................... 1-327572
Dec. 18, 1989 [JP] Japan ................... 1-327573
Dec. 18, 1989 [JP] Japan ................... 1-327830

[51] Int. Cl.$^5$ ............................ G03B 39/00
[52] U.S. Cl. ................... 354/70; 354/195.1
[58] Field of Search ........ 354/195.1, 202, 65, 354/70, 286; 358/222

[56] References Cited

U.S. PATENT DOCUMENTS 4,864,339  9/1989  Gross et al. ................... 354/202
4,970,540 11/1990  Vasey et al. ................... 354/202

Primary Examiner—David M. Gray
Attorney, Agent, or Firm—Robin, Blecker, Daley & Driscoll

[57] ABSTRACT

An image shake suppressing device for a camera comprises an image shake suppressing optical system, a first guide part for guiding the image shake suppressing optical system to be movable in a first direction within a plane perpendicular to an optical axis, a second guide part for guiding the optical system to be movable in a second direction within the plane perpendicular to the optical axis, and a driving part arranged to exert a magnetic driving force on the optical system either in the first or second direction and thus to cause the optical system to be moved according to a guiding action of the first or second guide part. The driving part includes a first element arranged to generate the magnetic driving force and which generates a magnetic flux at least in response to an electrical signal. The driving part also includes a second element which generates a flux at all times. One of these elements is fixed to the image shake suppressing optical system and the other to a predetermined position.

12 Claims, 19 Drawing Sheets

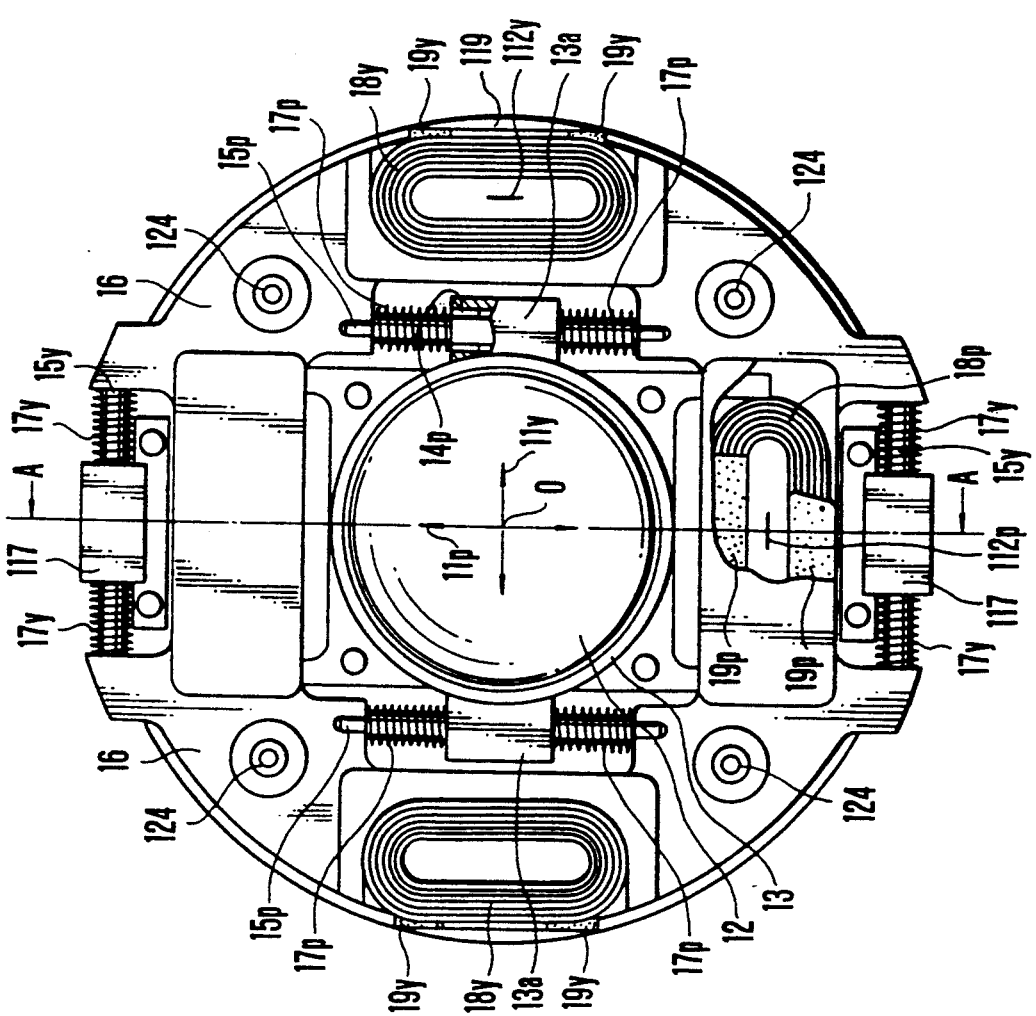

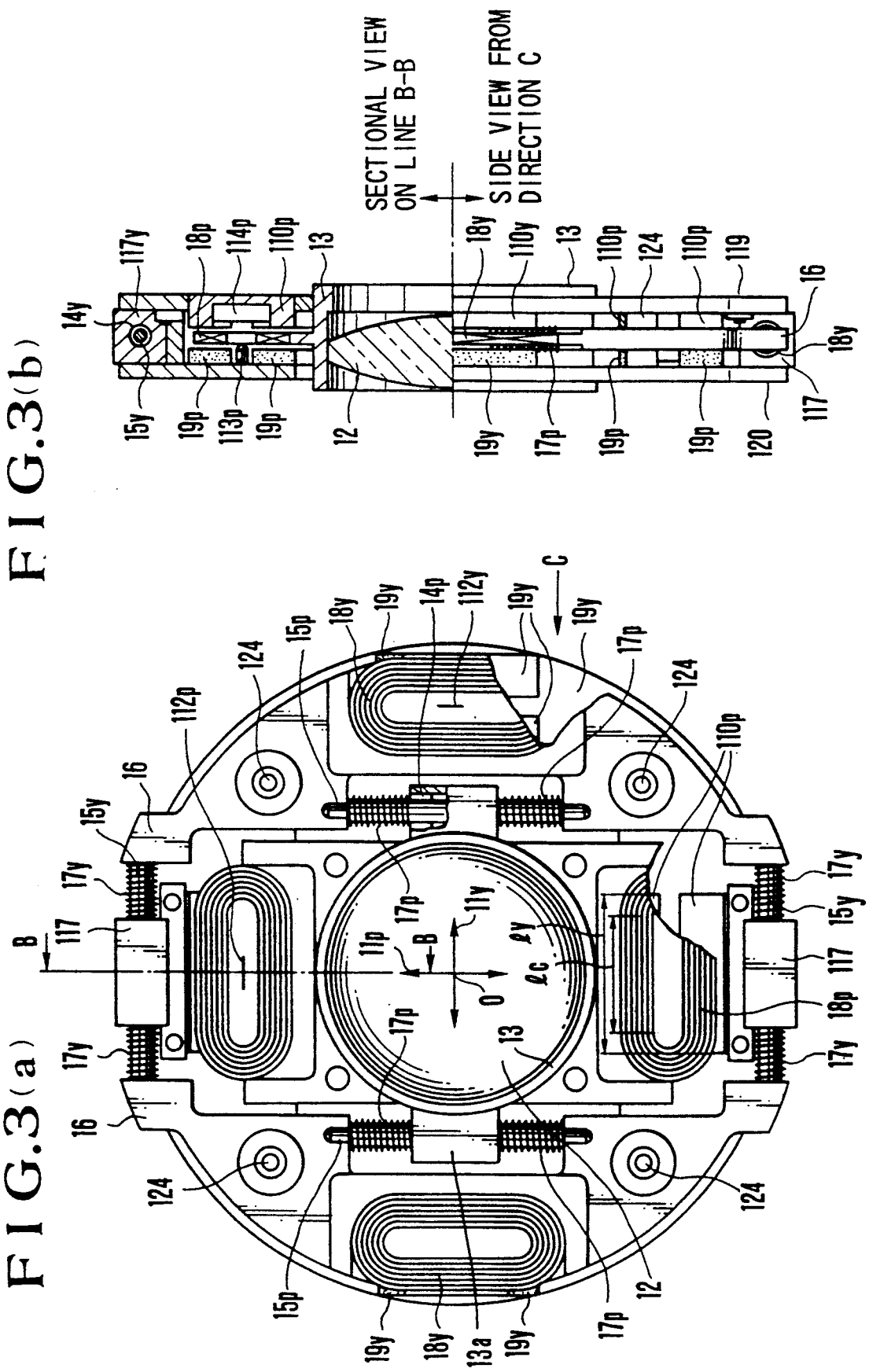

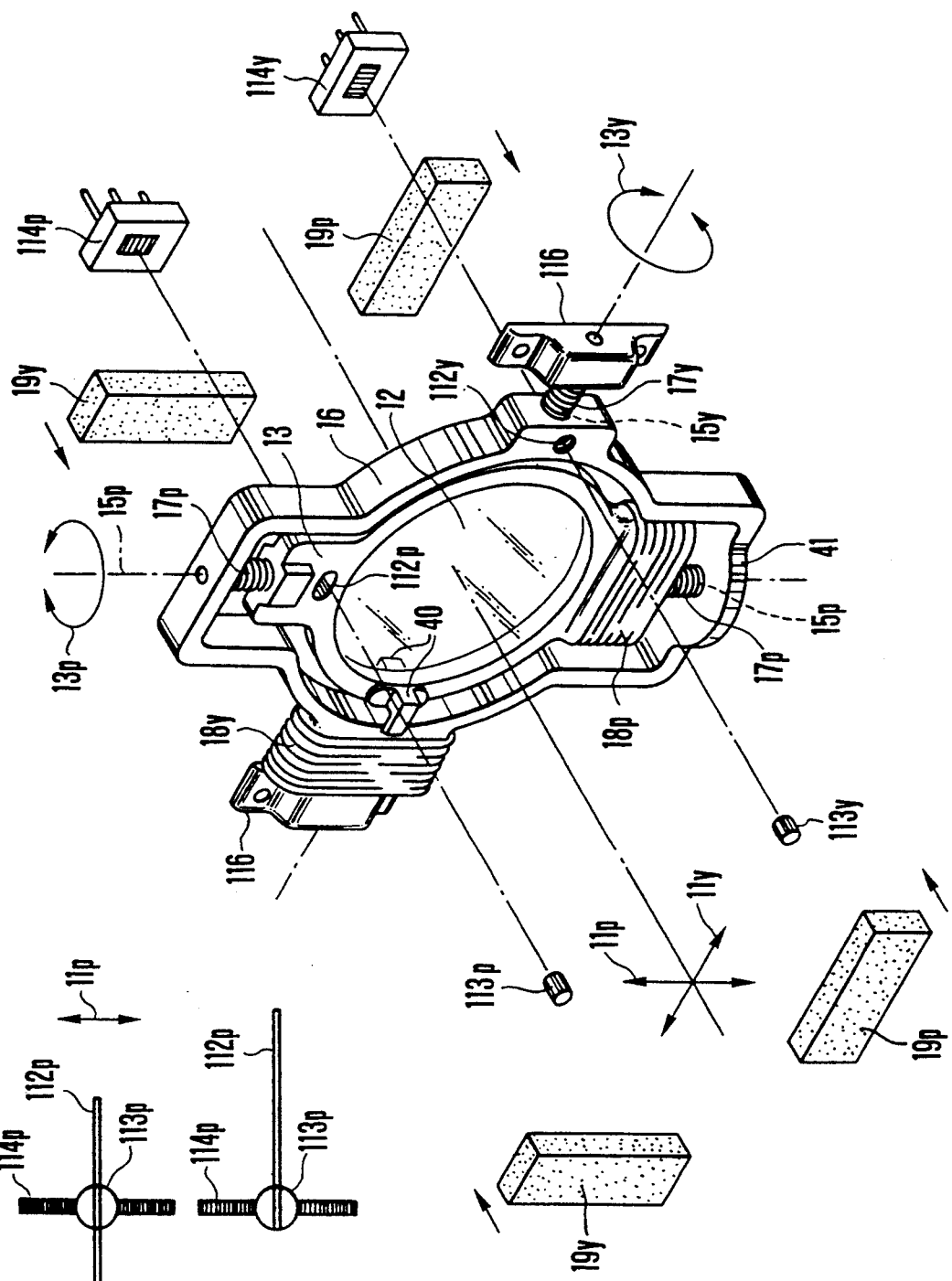
FIG. 5
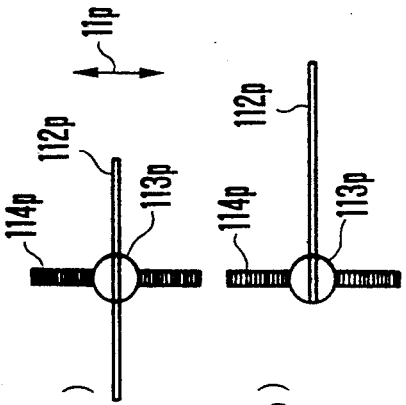
FIG. 4(a)
FIG. 4(b)

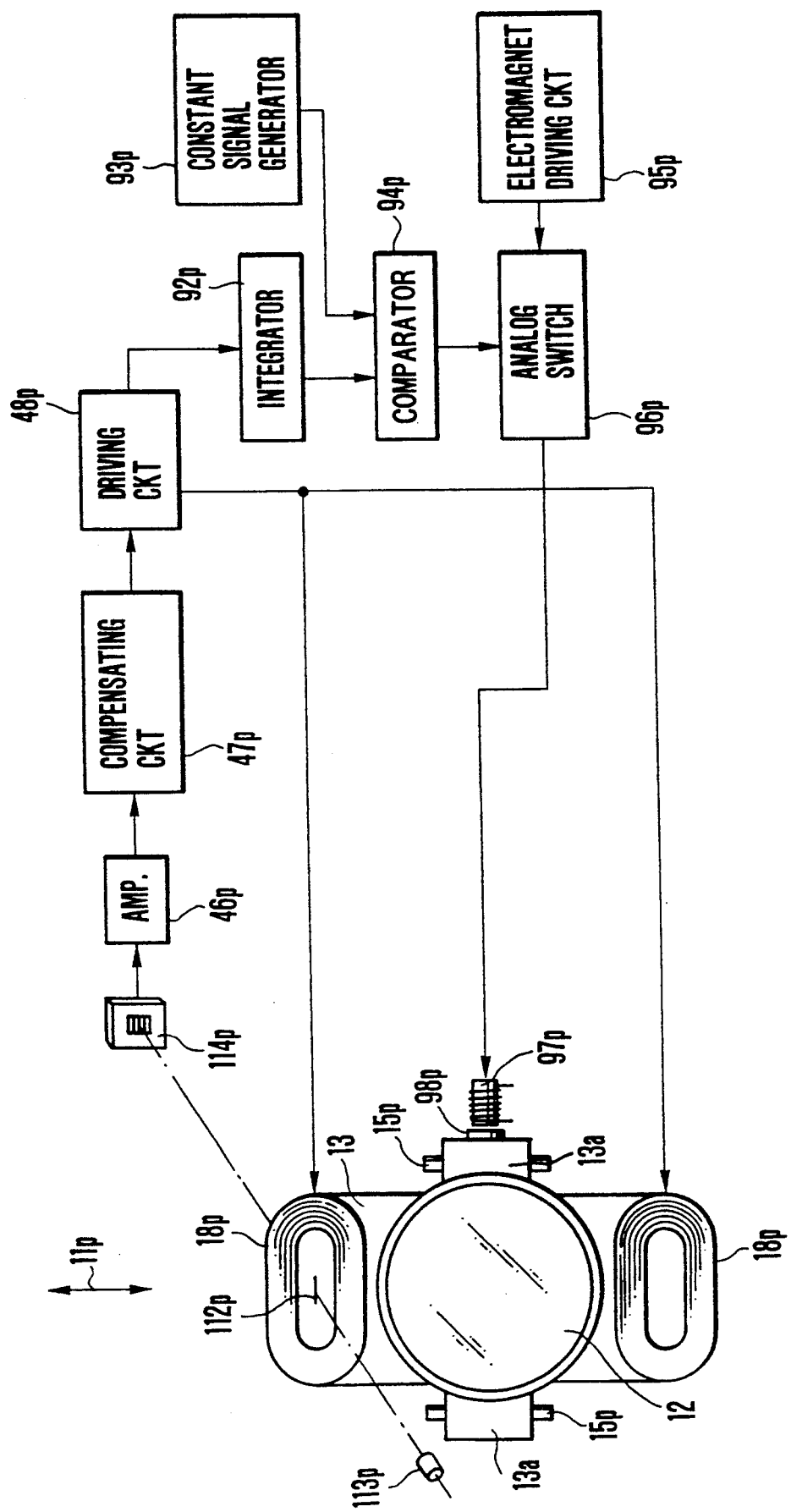
F I G. 23

IMAGE SHAKE SUPPRESSING DEVICE FOR CAMERA

This is a continuation application under 37 CFR 1.62 of prior application Ser. No. 626,985. filed Dec. 13, 1990, now abandoned.

BACKGROUND OF THE INVENTION

1. Field of the Invention:

This invention relates to an image shake suppressing device which is equipped with a camera or the like and arranged to detect vibrations of a relatively low frequency and to suppress a shake of an image on the basis of the detected vibrations as information to be used for preventing the image shake and more particularly to an improvement on a correcting optical mechanism to be used for the device.

2. Description of the Related Art:

The prior art relative to this invention is described by way of example below on the assumption that the image shake suppressing device is applied to a camera.

The cameras of today are arranged to automatically carry out all the important shooting actions such as determining an exposure, focus adjustment, etc., in such a way as to minimize the possibility of a faulty photographing operation by a person unfamiliar with the camera. However, it is hardly possible to automatically prevent a photographic shooting failure resulting from a camera shake. Therefore, research has recently begun for a camera that is capable of preventing a shooting failure caused by the camera shake.

Generally, in the event of a camera shake, the camera vibrates at a frequency between 1 Hz and 12 Hz. In order that a picture is taken without any image shake despite of the camera shake, it is necessary to detect the vibrations of the camera and to displace a correcting lens according to a vibration value detected. Therefore, to attain this purpose, the vibration of the camera must be accurately detected and then an optical axis must be corrected for any change thereof that results from the camera shake.

Theoretically, it is possible to prevent a camera from vibrating by providing it with a vibration sensor which is arranged to detect an angular acceleration and an angular velocity; a camera shake detection system which is arranged to produce an angular displacement value obtained by electrically or mechanically integrating a signal produced from the vibration sensor; and a correcting optical mechanism which is arranged to decenter the optical axis.

FIG. 24 of the accompanying drawings shows by way of example the prior art arrangement of the correcting optical mechanism, which is of a parallel-link type and is disclosed in U.S. Pat. No. 4,864,339. Referring to FIG. 24, a stationary frame 23 which carries a correcting lens 22 for suppressing an image shake is mounted on a first holding frame 26 through a pitch parallel link 235p. This arrangement enables the stationary frame 23 to be movable relative to the first holding frame 26 in the pitch direction 21p. The first holding frame 26 is mounted on a second holding frame 219 through a yaw parallel link 235y in such a way as to be movable relative to the second holding frame 219 in the yaw direction 21y. Further, since the second holding frame 219 is secured to a lens barrel which is not shown, the correcting lens 22 is movable in the pitch and yaw directions 21p and 21y relative to the lens barrel. Coreless motors 230p and 230y are mounted on the lens barrel through base plates 230p and 230y. On the coreless motors 231p and 231y are mounted cams 232p and 232y (not shown) which are arranged to be in contact with the stationary frame 23 and the first holding frame 26 respectively. An intermediate plate 233 and a ball bearing 234 are arranged to remove any friction from between the cam 232p and the stationary frame 23.

When the cams 232p and 232y are lifted by the rotation of the coreless motors 231p and 231y, the stationary frame 23 and the first holding frame 26 are pushed by these cams. This causes the correcting lens 22 to be driven in the pitch and yaw directions 21p and 21y.

Further, springs 236p and 236y are mounted on the parts of the frames 23 and 26 located opposite to the cams 232p and 232y. Since the cams 232p and 232y are constantly pushed by these springs, the correcting lens 22 is driven in the reverse direction when the lift height of the cams 232p and 232y is decreased by the reverse rotation of the coreless motors 231p and 231y.

However, the correcting optical mechanism which is arranged in the above-stated manner necessitates use of the intermediate plate 233 and the ball bearing 234 as the friction removing means to be arranged between the cam 232p and the stationary frame 23 and between the cam 232y and the first holding frame 26 respectively. The ball bearing 234 is not only expensive but also requires a large space. Besides, the arrangement necessitates removal of play between the cams 232p and 232y and the frames 23 and 26 by the forces of the springs 236p and 236y. Therefore, the conventional device is incapable of following any movement exceeding the resonance frequency of the springs. This problem may be solved by increasing the force of the springs. However, the power of the coreless motors 231p and 231y is limited. Besides, the spring force cannot be sufficiently increased in respect of consumption of electric energy. It has been thus impossible to cause the correcting optical mechanism to follow the shake of the camera at a sufficiently high speed.

SUMMARY OF THE INVENTION

This invention is directed to the solution of the above-stated problems. It is, therefore, a principal object of the invention to provide an image shake suppressing device for a camera which is arranged to be capable of solving the above-stated problems by causing an image shake suppressing optical system to follow a shaking state of the camera without increasing the cost and the space of the camera and to be capable of excellently responding to the whole range of vibrations from a low-frequency vibration to a high-frequency vibration.

To attain this object, the image shake suppressing device for a camera arranged according to this invention comprises an image shake suppressing optical system; first guide means for guiding the image shake suppressing optical system to be movable in a first direction within a plane perpendicular to an optical axis; second guide means for guiding the image shake suppressing optical system to be movable in a second direction within the plane perpendicular to the optical axis; and driving means arranged to exert a magnetic driving force on the image shake suppressing optical system either in the first or second direction and thus to cause the image shake suppressing optical system to be moved according to a guiding action of the first or second guide means. The driving means includes a first element arranged to generate the magnetic driving force and which generates a magnetic flux at least in response to an electrical signal. The driving means also includes a second element which generates a flux at all times. One of these elements is fixed to the image shake suppressing optical system and the other to a predetermined position.

The above and other objects and features of the invention will become apparent from the following detailed description of embodiments thereof taken in connection with the accompanying drawings.

BRIEF DESCRIPTION OF THE DRAWINGS

FIGS. 2(a) and 2(b) show the details of a correcting optical mechanism shown in FIG. 1, FIG. 2(a) being a partly sectional front view and FIG. 2(b) a sectional view taken on a line A—A of FIG. 2(a). FIGS. 3(a) and 3(b) show the correcting optical mechanism of FIG. 1 arranged as another embodiment of the invention, FIG. 3(a) being a partly sectional plan view and FIG. 3(b) a sectional view taken on a line B—B and a side view taken in the direction of arrow C of FIG. 3(a). FIGS. 4(a) and 4(b) show position detecting means in relation to a slit shown in FIGS. 3(a) and 3(b). FIG. 5 is an exploded oblique view showing the correcting optical mechanism of FIG. 1 arranged as a further embodiment of the invention. FIG. 23 shows in outline the correcting optical mechanism of FIG. 1 arranged according to this invention as a still further embodiment thereof.

DETAILED DESCRIPTION OF THE PREFERRED EMBODIMENTS

Figure 1:
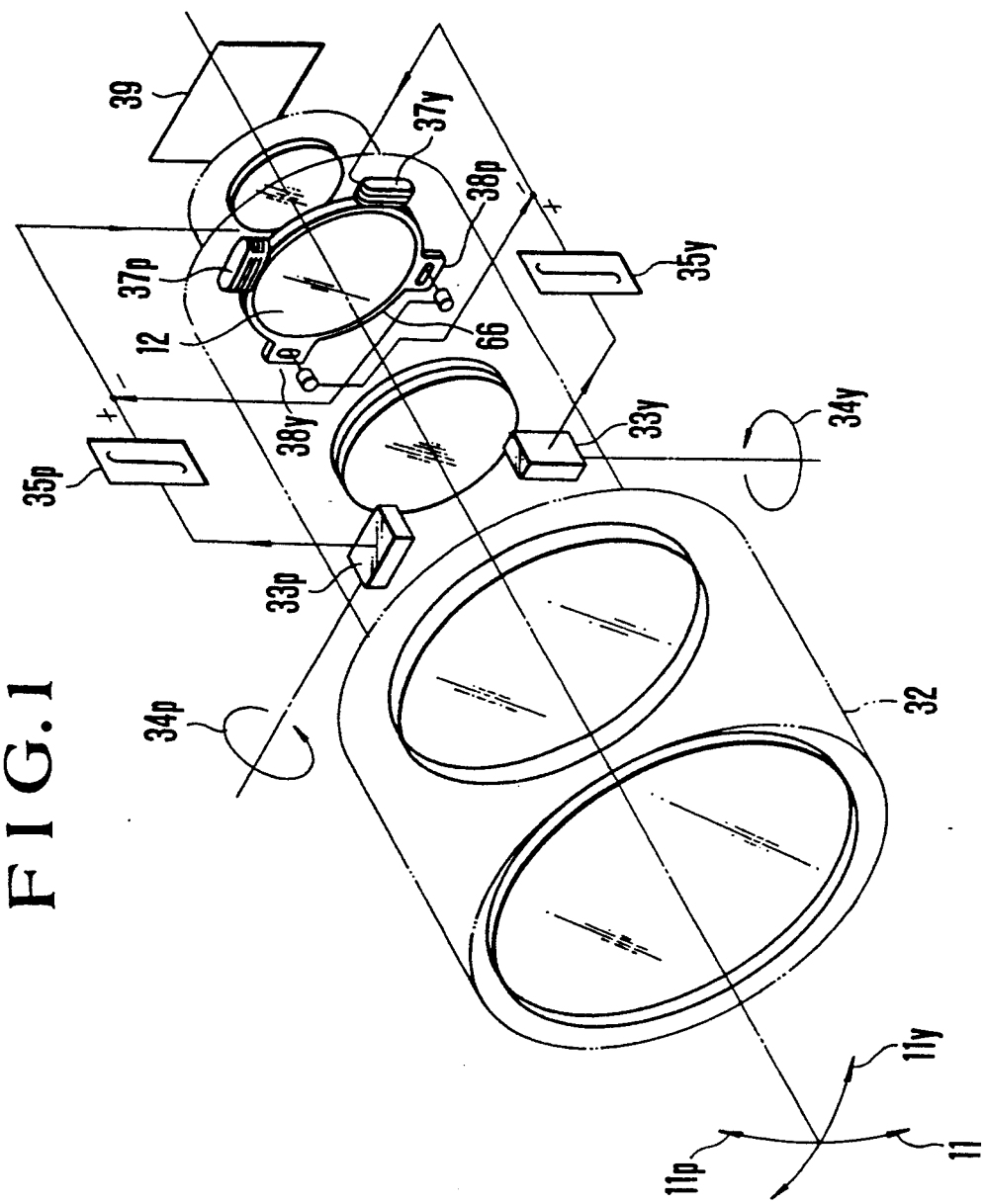
FIG. 1 is an exploded view showing in outline the arrangement of the image shake suppressing system for a camera which uses an angular velocity meter according to this invention as an embodiment thereof.

The following describes the embodiments of this invention with reference to the accompanying drawings:

FIG. 1 shows in outline an example of a system arranged according to this invention to suppress vertical and transverse shakes $11p$ and $11y$ of a camera which take place in the direction of arrows 11. Referring to FIG. 1, the illustration includes a lens barrel 32. Angular velocity meters $33p$ and $33y$ are arranged to detect the angular velocity of the vertical shake of the camera and that of the transverse shake of the camera in angular velocity detecting directions $34p$ and $34y$ respectively. Known analog integrating circuits $35p$ and $35y$ are arranged to integrate signals output from the angular velocity meters $33p$ and $33y$ and to convert the integrated signals into signals representing the angular displacement values of the camera shake. A correcting optical system 12 which forms a part of a photo-taking optical system of the camera is arranged to be driven on the basis of the signals thus obtained and to stabilize an image plane 39 by suppressing an image shake. The correcting optical system 12 is provided with driving parts $37p$ and $37y$ and correcting optical position detecting sensors $38p$ and $38y$. Each of the correcting optical mechanisms which will be described hereinafter is composed of these parts. Further, the above-stated analog integrating circuits may be omitted by arranging the correcting optical mechanism to perform a mechanical integrating action in place of the analog integrating circuits.

FIGS. 2(a) and 2(b) show the details of the correcting optical mechanism of FIG. 1, FIG. 2(a) showing it in a plan view and FIG. 2(b) in a sectional view taken on a line A—A of FIG. 2(a). To simplify the illustration, a stator 120 and a light projector $113p$ which is shown on the left side of FIG. 2(b) is omitted from FIG. 2(a).

The correcting optical mechanism is arranged to be driven both in the pitch and yaw directions as indicated by arrows $11p$ and $11y$ in FIG. 2(a). The two directions are arranged to orthogonally intersect the optical axis O. The following description begins with the driving action to be performed in the pitch direction $11p$.

In FIGS. 2(a) and 2(b), a reference numeral 12 denotes the correcting optical system of FIG. 1 which is provided for suppressing the image shake. This correcting optical system is secured to an annular lens holding frame 13. In the case of this embodiment, the frame 13 is provided with boss parts 13a which horizontally extend from two sides of the frame 13, i.e., on right and left sides as viewed in FIG. 2(a), and are arranged to serve as bearings. Each of the boss parts 13a is provided with a hole part which vertically pierces the boss part as viewed on FIG. 2(a). As is shown in part in a sectional view in FIG. 2(a), bushes $14p$ which are made of an oil-less metal material are fitted into the hole parts of the boss parts 13a. The lens holding frame 13 is carried through the bushes 14p in such a way as to be vertically slidable by means of pitch shafts 15p which are secured to a first holding frame 16. The lens holding frame 13 is thus arranged to be vertically slidable by the first holding frame 16 through the right and left sliding bearing bushes 14p.

Pitch coil springs 17p are mounted on the pitch shafts 15p between each of the upper and lower mount parts on the first holding frame 16 and each of the boss parts 13a of the lens holding frame 13. The lens holding frame 13 is thus kept in a neutral position in the vertical direction as viewed in FIG. 2(a) in a balanced state by means of the spring forces of these pitch coiled springs 17p.

Pitch coils 18p which are shown partly in a sectional view in FIG. 2(a) are secured to the upper and lower parts of the lens holding frame 13. Pitch magnets 19p and pitch yokes 110p are disposed on both sides of the pitch coils 18p in such a way as to have the pitch coils 18p sandwiched in between them in the direction of the thickness of these coils, as shown in FIG. 2(b). The pitch magnets 19p and the pitch yokes 110p form magnetic circuits 111 as indicated by broken lines in FIG. 2(b). The pitch coils 18p are located within the magnetic circuits 111. The driving part 37p of FIG. 1 is thus arranged to drive and move the lens holding frame 13 (the correcting optical system 12) vertically as viewed in FIG. 2(a), i.e., in the pitch direction 11p, relative to the first holding frame 16 by an electromagnetic power obtained by applying a current to each of the pitch coils 18p.

The pitch coil 18p is provided with a slit 112p. A light projector 113p such as an infrared light emitting diode (IRED) or the like and a light receiver 114p such as a semiconductor detecting element (PSD) or the like are arranged in combination across the slit 112p. The correcting optical position detecting sensor 38p shown in FIG. 1 is formed by the combination of these parts. The position in the pitch direction 11p of the lens holding frame 13 relative to the first holding frame 16 is thus arranged to be detected by the detecting sensor 38p.

The lens holding frame 13 is thus arranged to be floatingly carried by the first holding frame 16 for movement in the pitch direction 11p. Meanwhile, the first holding frame 16 is likewise arranged to be floatingly carried by a second holding frame 119 for movement in the yaw direction 11y as described below:

The first holding frame 16 is provided with a pair of upper and lower yaw shafts 15y which extend in the yaw direction 11y. These yaw shafts 15y are slidably fitted, through bushes 14y made of an oil-less metal material, into thorough holes laterally formed in housings 117 which are arranged to serve as the boss parts of the second holding frame 119 as shown in FIG. 2(a). The first holding frame 16 is thus carried by the second holding frame 119 in such a way as to be slidable in the yaw direction 11y, i.e., to the right and left as viewed in the drawing. The lens holding frame 13 is thus floatingly carried to be movable not only in the pitch direction 11p relative to the first holding frame 16 but also in the yaw direction 11y relative to the second holding frame 119.

A pair of yaw coil springs 17y are arranged on the yaw shafts 15y in such a way as to keep the first holding frame 16 in a neutral position relative to the second holding frame 119.

Yaw coils 18y are secured to the first holding frame 16. Like the above stated pitch coils 18p, these yaw coils 18y are located within magnetic circuits. The magnetic circuits are formed by yaw magnets 19y which are secured to the second holding frame 119 and yaw yokes 110y which are not shown. The driving part 37y shown in FIG. 1 is formed by these parts. When currents are applied to the yaw coils 18y to excite them, the first holding frame 16 is driven by the driving part 37y to move to the right or left, i.e., in the yaw direction 11y, relative to the second holding frame 119.

Further, the yaw coil 18y is provided with a slit 112y. A light projector, such as an infrared ray emitting diode (IRED) or the like, which is not shown but is secured to the second holding frame 119, and a light receiver such as a semiconductor detecting element (PSD) or the like which is also not shown are arranged across the slit 112y. These parts jointly form the correcting optical position detecting sensor 38y of FIG. 1 for detecting the position of the first holding frame 16 in the yaw direction 11y relative to the second holding frame 119.

With the embodiment arranged in the manner as described above, the lens holding frame 13 (i.e., the correcting optical system 12) are floatingly carried within a plane orthogonally intersecting the optical axis O (a plane including a line P—P' of FIG. 2(b)) to be movable both in the pitch and yaw directions 11p and 11y. An advantage of the embodiment lies in that the position of the optical system never varies in the direction of the optical axis even in the event of decentering control performed over the optical axis by moving the optical system within the above-stated plane for the purpose of suppressing an image shake. This ensures that the focus of the photo-taking optical system is never disturbed by the image shake suppressing action.

The correcting optical system 12 is, as mentioned above, carried in a state of being movable in the bi-axial directions 11p and 11y by using the pitch shaft and the yaw shaft. Therefore, compared with the conventional correcting optical mechanism, the invented mechanism can be more compactly arranged. This permits the camera to have an image shake suppressing system included therein without increasing the size of it or its lens.

FIGS. 3(a) and 3(b) show the correcting optical mechanism of FIG. 1 in a state of being arranged as another embodiment of the invention. In FIG. 3(b), a part of FIG. 3(a) above the optical axis is shown in a sectional view as taken along a line B—B, while a part below the optical axis is shown in a side view as taken in the direction of arrow C. In FIG. 3(a), a stator 120 and a light projector 113p which are shown on the left side of FIG. 3(b) are omitted for the sake of simplification of the illustration.

In FIGS. 3(a) and 3(b), the same component parts as those of FIGS. 2(a) and 2(b) are indicated by the same reference numerals. Other drawings showing further embodiments described hereinafter are also arranged in the same manner.

This embodiment differs from the embodiment shown in FIGS. 2(a) and 2(b) in the following point: the pitch magnets 19p and the pitch yokes 110p which are arranged across the pitch coils 18p are removed from the first holding frame 16. The pitch magnets 19p are mounted on the stator 120 and the pitch yokes 110p on the second holding frame 119 respectively. According to this change, the light projector 113p is mounted on the stator 120 and the light receiver 114p on the second holding frame 119 respectively. With the exception of this point, all other parts are arranged in the same manner as in FIGS. 2(a) and 2(b) and are thus omitted from description.

The stationary frame 13 moves in the yaw direction 11y accordingly as the first holding frame 16 moves in the same direction. This causes the positions of the pitch yoke 110p and the pitch magnet 19p to change relative to the position of the pitch coil 18p. However, since the length 1y of the pitch magnet 19p and pitch yoke 110p in the yaw direction 11y is arranged to satisfy a formula shown below, the length of a thrust generating part within the magnetic circuit remains unchanged and, therefore, the thrust of the coil 18p which drives the stationary frame 13 in the pitch direction 11p remains unchanged even when the first holding frame 16 comes to the utmost end in the yaw direction 11y. In the formula shown below, "1c" represents the thrust generating part of the pitch coil 18p for driving in the pitch direction 11p and "Sy" the maximum stroke of the first holding frame 16:

$$1c + Sy < 1y$$

The slit 112p provided in the stationary frame 13 is arranged likewise to extend long in the yaw direction 11y. When the first holding frame 16 is in a neutral state in the yaw direction 11y, the slit 112p, the light projector 113p and the light receiver 114p are in a relation shown in FIG. 4(a). Under this condition, the movement of the slit 112p in the pitch direction 11p (the shift of the stationary frame 13 in the pitch direction 11p) is detected. When the first holding frame 16 is at the utmost end position in the yaw direction 11y, there obtains a relation shown in FIG. 4(b). Even in that case, the movement of the stationary frame 13 in the pitch direction 11p can be adequately detected.

In this embodiment, the heavy parts including the pitch magnets 19p, the pitch yokes 110p and position detecting means, etc., which are mounted on the first holding frame 16 in the case of the embodiment shown in FIGS. 2(a) and 2(b) are mounted on stationary parts, such as the stator 120 and the second holding frame 119 in the case of this embodiment. This arrangement reduces the weight of the first holding frame 16 which is one of the parts to be driven and thus enables an image shake suppressing device to accurately follow the image shake even in the case of high-frequency vibrations.

FIG. 5 shows in an exploded oblique view the correcting optical mechanism of FIG. 1 as being arranged as a further embodiment of this invention. This embodiment differs from the embodiments shown in FIGS. 2(a) and 2(b) and FIGS. 3(a) and 3(b) in that both the pitch shaft 15p and the yaw shaft 15y are singly arranged. Meanwhile, a voice-coil like pitch coil 18p and a voice-coil like yaw coil 18y are wound on bobbins having their centers on these shafts respectively.

With the pitch and yaw coils 18p and 18y thus arranged in a voice-coil like shape, pitch magnets 19p and yaw magnets 19y which have their polarity repellent in the directions of arrows are opposed to these voice coils.

This arrangement allows the stationary frame 13 to rotate (arrow 13p) around the pitch shaft 17p. To prevent this, therefore, a stopper 40 is provided between the stationary frame 13 and the first holding frame 16.

A recessed part 41 is provided in the first holding frame 16 for preventing the first holding frame 16 from rotating around the yaw shaft 15y (as indicated by an arrow 13y) by causing the first holding frame 16 to abut on the second holding frame which is not shown. A housing 116, pitch and yaw magnets 19p and 19y, light projectors 113p and 113y and light receivers 114p and 114y are secured to the second holding frame which is not shown.

Figure 6A:
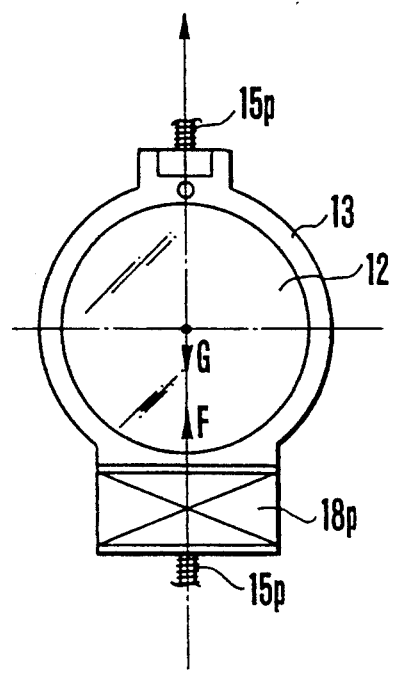
FIGS. 6(a) and 6(b) are front and side views showing the essential parts of FIG. 5.
Figure 6B:
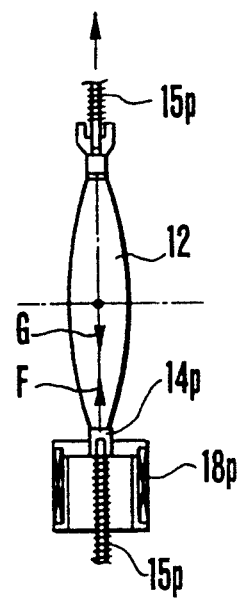

With the embodiment arranged in this manner, the center of total gravity of the stationary frame 13 and the correcting optical system 12 and the center of thrust of the pitch coil 18p are obtained on the pitch shaft 15p, as shown in FIGS. 6(a) and 6(b). Therefore, the stationary frame 13 never rotates. This permits a smooth driving action without any twist around the optical axis. The pitch shaft 15p is never damaged. Besides, since the sliding bearing 14p of the pitch shaft 15p is disposed within the bobbin of the voice-coil like pitch coil 18p, the embodiment can be very compactly arranged. Further, although it is impossible to have centers of gravity coincide in the yaw direction 11y, the center of thrust of the yaw coil 18y is arranged to be obtained on the yaw shaft 15y.

Figure 7:
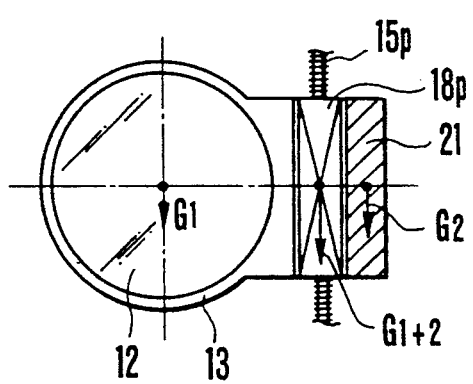
FIG. 7 is a front view showing the essential parts of the correcting optical mechanism of FIG. 1 arranged as a further embodiment of the invention.

FIG. 7 shows the correcting optical mechanism of FIG. 1 as being arranged as a further embodiment of this invention. The illustration includes only a driving part for driving in the pitch direction. Unlike the arrangement shown in FIG. 6(a), the center of gravity of the correcting optical system 12 provided for image shake suppression and that of the stationary frame 13 deviate and are not on the pitch shaft 15p. However, the stationary frame 13 is provided with a counter weight 21 which is disposed on the opposite side of the pitch shaft 15p confronting the frame 13 across the shaft 15p. The mass of the counter weight 21 is arranged in such a way as to have the center of total weight of the correcting optical system 12, the stationary frame 13 and the counter weight 21 on the pitch shaft 15p. Therefore, both the center of thrust and the center of gravity are on the pitch shaft 15p. The arrangement thus eliminates the possibility of any twist around the optical axis in driving and prevents the shaft from being damaged.

The arrangement shown in FIG. 7 is advantageous in cases where only a small space is available for the correcting optical system 12. Further, in FIG. 7, the pitch coil 18p is a voice coil which is wound around a bobbin having its center coaxially with the pitch shaft 15p. Like in the case of FIGS. 5, 6(a) and 6(b), the pitch coil 18p has a bearing within the bobbin. Further, while the pitch coil 18p is shown in FIG. 7 as in a shape of a voice coil long extending along the pitch shaft 15p, this shape may be changed to a shape which is short in the longitudinal direction of the pitch shaft 15p.

Figure 8:
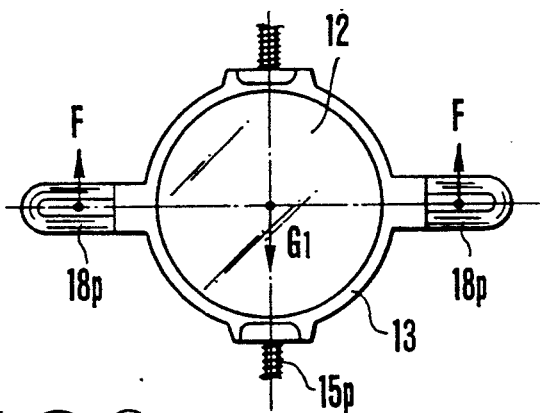
FIG. 8 is a front view showing the essential parts of the correcting optical mechanism of FIG. 1 arranged as a further embodiment of the invention.

FIG. 8 shows the correcting optical mechanism of FIG. 1 as being arranged as a further embodiment of the invention. Referring to FIG. 8, while the center of gravity of the correcting optical system 12 and that of the stationary frame 13 are located on the axis of the pitch shaft 15p, pitch coils 18p are arranged to be axially symmetric with the pitch shaft 15p. Such being the arrangement, the center of total thrust is on the axis of the pitch shaft 15p, though the individual centers of thrust are not. This precludes the possibility of twisting and damaging.

Figure 9:
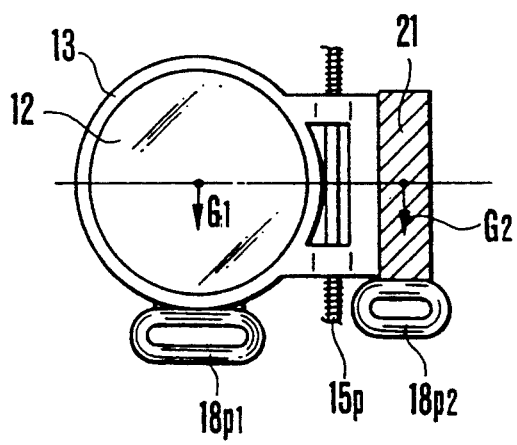
FIG. 9 is a front view showing the essential parts of the correcting optical mechanism of FIG. 1 arranged as a further embodiment of the invention.

FIG. 9 shows the correcting optical mechanism of FIG. 1 as being arranged as a further embodiment of the invention. Like in the case of FIG. 8, there are provided two pitch coils 18p. A counter weight 21 which is similar to the one shown in FIG. 7 is arranged to shift the center of gravity. In this case, as shown in FIG. 9, the center of total gravity of the stationary frame 13, the correcting optical system 12 and the counter weight 21 and the center of the total thrust of the pitch coils 18p1 and 18p2 are arranged to be on the pitch shaft 15p. Further, the number and location of the counter weight 21 and those of the pitch coil 18p may be selected in any suitable manner so long as their center of total gravity and their center of thrust are on the pitch shaft 15p. This allows a wide design latitude in consideration of the space available for the correcting optical mechanism.

Figure 10:
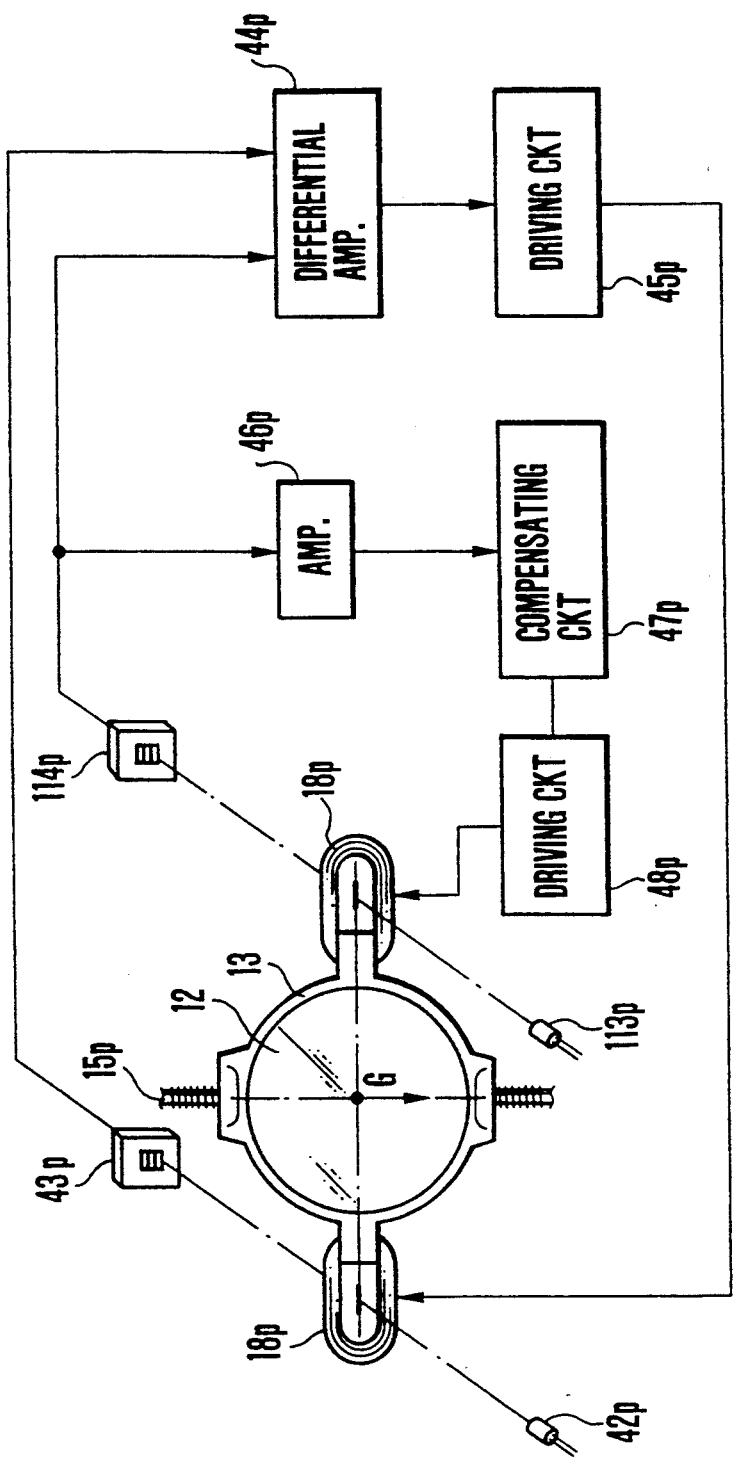
FIG. 10 shows in outline the correcting optical mechanism arranged as a further embodiment of the invention.

FIG. 10 shows the correcting optical mechanism of FIG. 1 as being arranged as a further embodiment of the invention. In this case, in addition to the light projector 113p, the light receiver 114p and the pitch coil 18p which jointly form a driving system for control over the correcting optical mechanism, there are provided another light projector 42p and another light receiver 43p. A differential amplifier 44p is arranged to obtain a difference between the output of the light receiver 113p and that of the light receiver 43p. Then, the rotating position of the correcting optical system 12 in the optical axis direction is detected from the output of the differential amplifier 44p. A driving circuit 45p is arranged to drive the pitch coil 18p to correct rotation by receiving the output of the differential amplifier 44p. By virtue of this arrangement, the rotation causes no twist and no damage. Referring to FIG. 10, the amplifier 46p is arranged to amplify the output of the light receiver 114p. A compensating circuit 47p is arranged to stabilize the driving circuit 48p which is arranged to apply a current to the pitch coil 18p.

The other pitch coil 18p may be arranged to be driven by likewise arranging an amplifier, a compensating circuit and a driving circuit also on the side of the other light receiver 43p.

Figure 11:
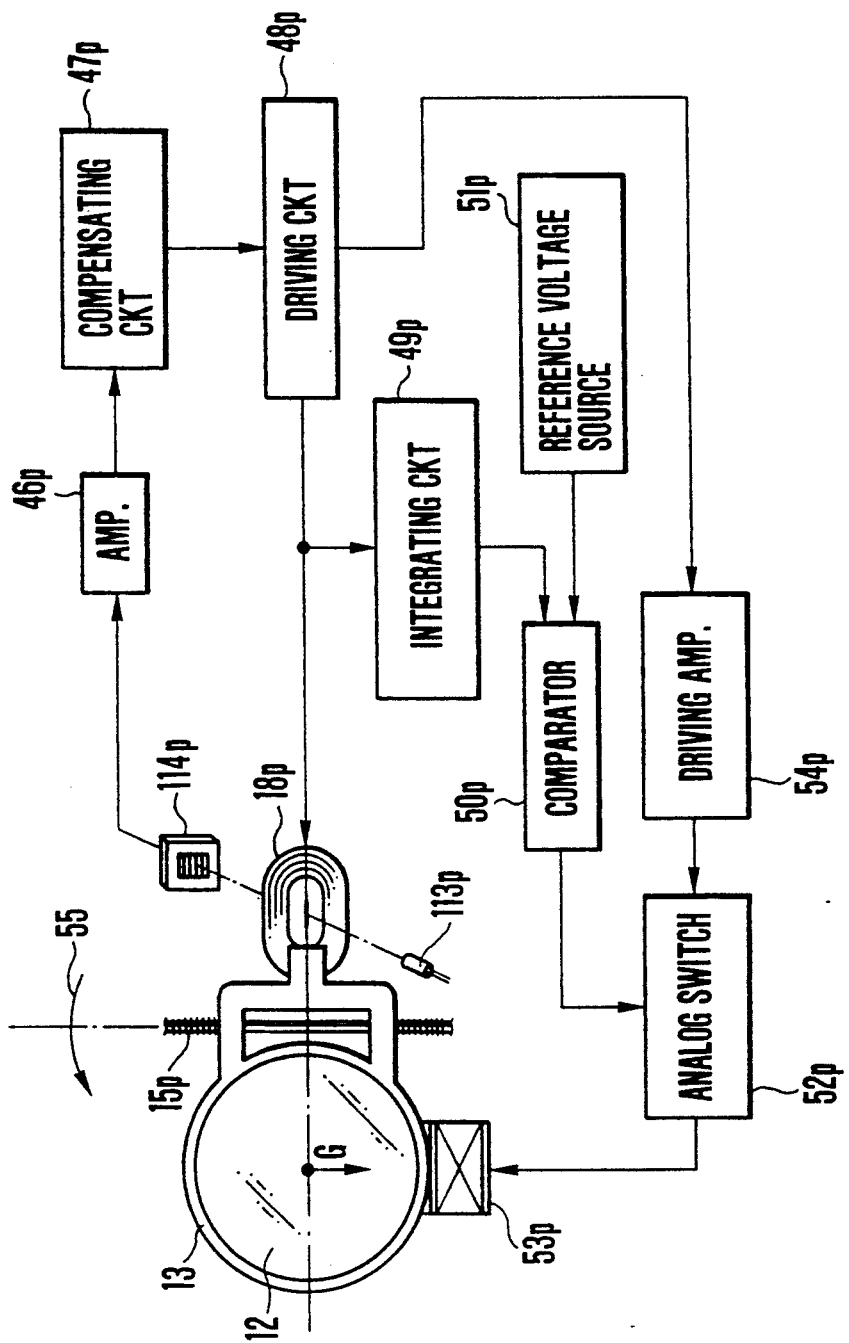
FIG. 11 shows in outline the correcting optical mechanism arranged as a further embodiment of the invention.

FIG. 11 shows the correcting optical mechanism of FIG. 1 as being arranged as a further embodiment of the invention. Like the embodiment shown in FIG. 10, this embodiment is also provided with a light projector 113p, a light receiver 114p, an amplifier 46p, a compensating circuit 47p and a driving circuit 48p for performing driving control over the correcting optical system by means of the pitch coil 18p. In addition to that, in this case, the output of the driving circuit 48p is supplied to an integrating circuit 49p. Then, the output of the integrating circuit 49p is supplied to a comparator 50p to be compared with a reference voltage obtained from a reference voltage source 51p. The comparator 50p is arranged to produce an output if the thrust imparted to the pitch coil 18p remains unvarying for a given period of time. An analog switch 52p is arranged to connect a pitch coil 53p to a driving amplifier 54p according to the output of the comparator 50. This brings about some twisting force on the pitch shaft 15p. When this necessitates the pitch coil 18p to have a large thrust over a long period of time, the output of the driving circuit 48p is amplified by the driving amplifier 54p before it is supplied to the pitch coil 53p. For example, when the twist takes place while the pitch coil 18p is being driven, the stationary frame 13 turns in the direction of arrow 55 and ceases to move. Then, to move it, the pitch coil 18p continuously applies a large thrust. In this instance, the twist can be removed by imparting a thrust to the pitch coil 53p to apply a torque in a direction reverse to the direction of arrow 55.

With the embodiments arranged as shown in FIGS. 10 and 11, the center of thrust is shifted to the pitch shaft only when necessary. Compared with a device arranged to constantly impart the thrust to a plurality of coils, these embodiments save electrical energy.

According to the arrangement of each of the embodiments shown in FIGS. 5 to 11, the center of thrust in the pitch direction and the center of gravity of the parts to be driven and moved in the pitch direction, including the correcting lens, are located on the pitch shaft; or the center of thrust is shifted to the pitch shaft by arranging, on both sides of the pitch shaft, the driving means which shifts the center of gravity to the pitch shaft by means of the counter weight. Therefore, the driving action can be smoothly accomplished without twisting and without damaging the shaft.

It is another advantage that the twisting can be prevented by electrically detecting any sign of occurrence of the twist and by shifting the center of gravity and that of thrust to an apposite point. A further advantage of these embodiments resides in that the correcting optical mechanism can be very compactly arranged with the bearing disposed within the bobbin of the voice coil employed as driving means.

Figure 12B:
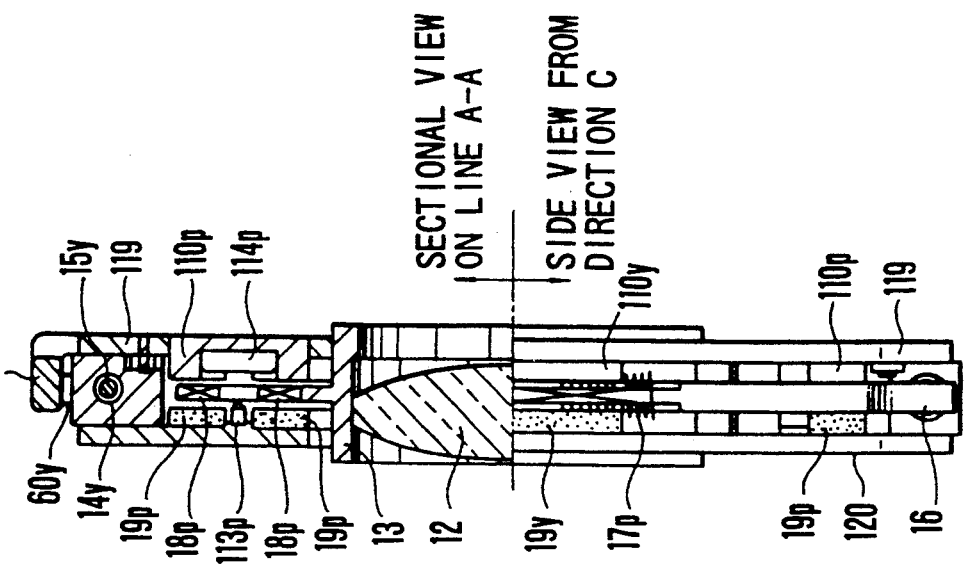
FIGS. 12(a) and 12(b) show the correcting optical mechanism of FIG. 1 arranged as a further embodiment of the invention, FIG. 12(a) being a partly sectional plan view and FIG. 12(b) a sectional view taken on a line A—A and a side view taken in the direction of arrow C shown in FIG. 12(a).
Figure 12A:
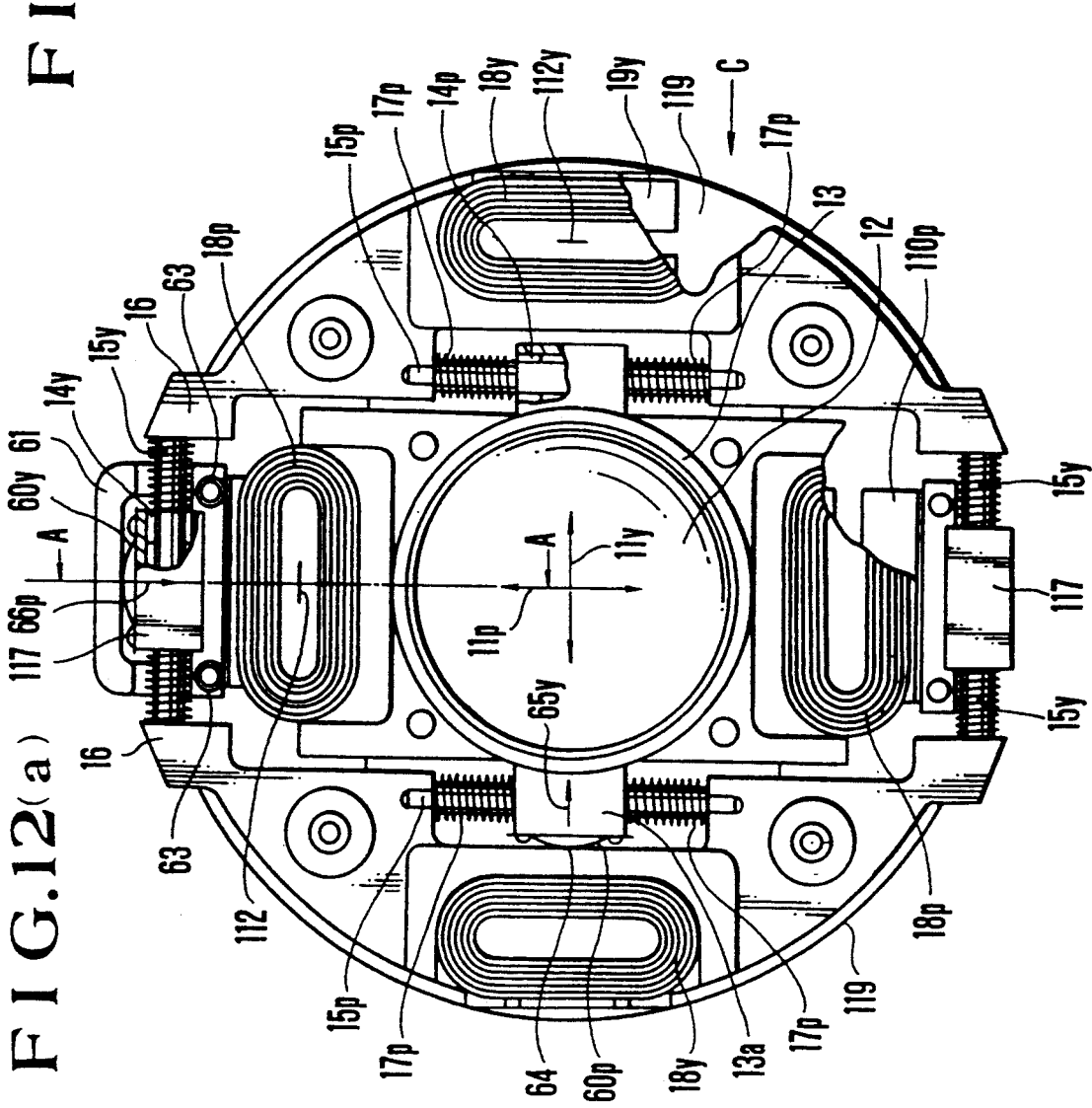

FIGS. 12(a) and 12(b) show the correcting optical mechanism of FIG. 1 as being arranged as a further embodiment of the invention. FIG. 12(a) is a partly sectional plan view. FIG. 12(b) is a sectional view taken on a line A—A and a side view taken in the direction of arrow C of FIG. 12(a).

The embodiment differs from the embodiments shown in FIGS. 2(a) and 2(b) and FIGS. 3(a) and 3(b) in the following point: a leaf spring 60p is interposed in between each of the boss parts 13a of the stationary frame 13 and the first holding frame 16 and a leaf spring 60y in between the retaining plate 61 of the second holding frame 119 and each housing 117. In addition to this, the housing 117 and the second holding frame 119 are mounted with a clearance 63 provided in the pitch direction 11p. Further, the leaf spring 60p is mounted on the boss part 13a in such a way as to be slidable over the first holding frame 16 in a state of point contact 64 in the pitch direction 11p.

Figure 13:
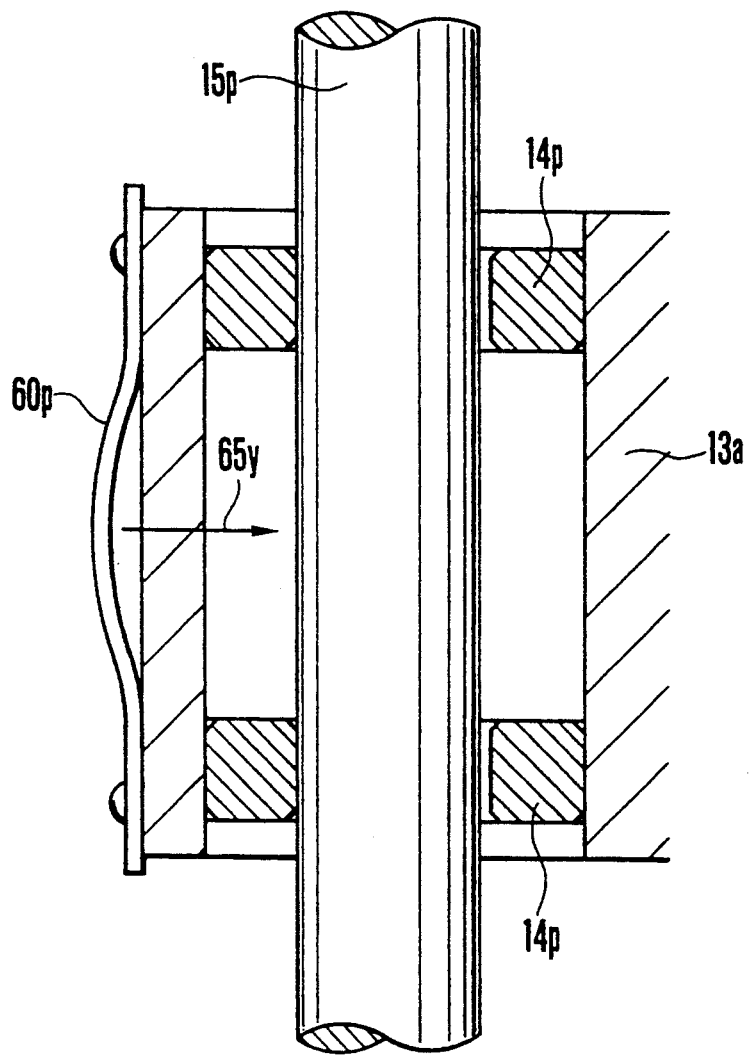
FIG. 13 is a sectional view showing the essential parts of FIGS. 12(a) and 12(b).

The stationary frame 13 is pushed in the direction of arrow 65y by the leaf spring 60p. As a result, one side of the pitch shaft 15p is constantly in contact with the bearing 14p, as shown in FIG. 13. This allows no rotation and thus prevents any twisting.

Meanwhile, the retaining plate 61 is pushing the housing 117 in the direction of arrow 66p through the leaf spring 62y. Since there is provided a clearance in the same direction between the second holding frame 119 and the housing 117, no twist arises between the yaw shaft 15y and the bearing 14y, so that driving can be smoothly carried out.

Figure 14:
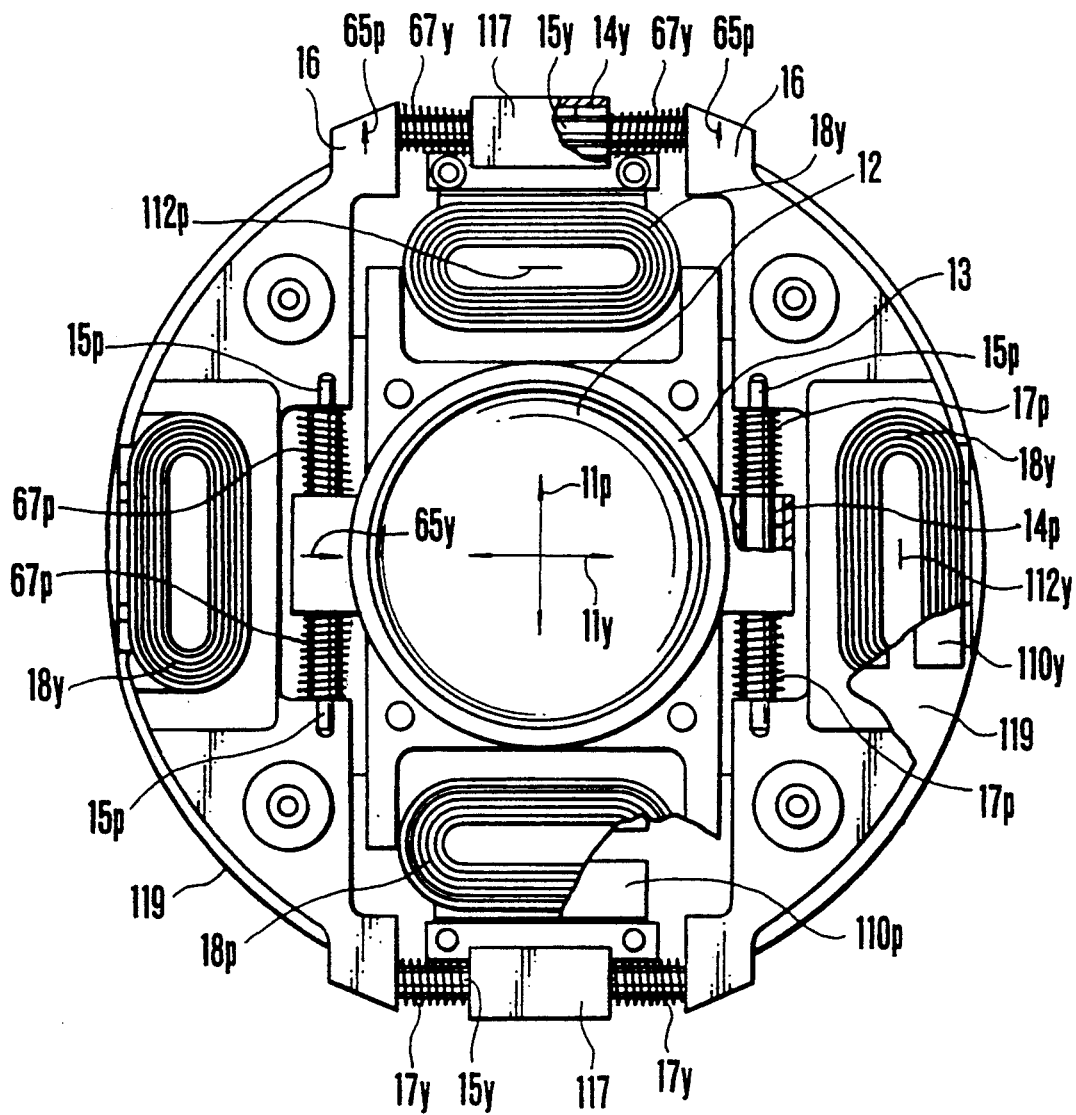
FIG. 14 is a plan view showing the correcting optical mechanism of FIG. 1 arranged as a further embodiment of the invention.

FIG. 14 shows the correcting optical mechanism of FIG. 1 as being arranged as a further embodiment of the invention. This embodiment differs from the embodiments shown in FIGS. 2(a) and 2(b) and FIGS. 3(a) and 3(b) in the following point: one of the paired pitch coil springs 17p and one of paired yaw coil springs 17y are changed to pressurizing pitch coil springs 67p and pressurizing yaw coil springs 67y respectively.

With the embodiment arranged in the above-stated manner, the components of force of the pressurizing coil springs 67p in the direction of the pitch shaft 15p mutually offset in the neighborhood of a neutral point of the stationary frame 13. Therefore, the stationary frame 13 can be kept in a neutral position by the pressurizing coil springs 67p in the same manner as by the pitch coil springs 17p. Further, since the pressurizing coil springs 67p have force components also in the direction of an arrow 65y, the stationary frame 13 is pushed in this direction. This brings the pitch shaft 15p and the bearing 14p into a state which is similar to the state shown in FIG. 13 and thus causes no twisting.

Further, the pressurizing coil spring 67y likewise pushes the first holding frame 16 in the direction of arrow 65p, there arises no twisting between the yaw shaft 15y and the bearing 14y to permit smooth driving.

In the case of this embodiment, the coil spring which is provided for supporting the center of the correcting lens (or optical system) 12 is arranged to serve also as pressure imparting means. This arrangement permits reduction in size, weight and cost of the device to a greater degree than the embodiment shown in FIGS. 12(a) and 12(b).

Figure 15A:
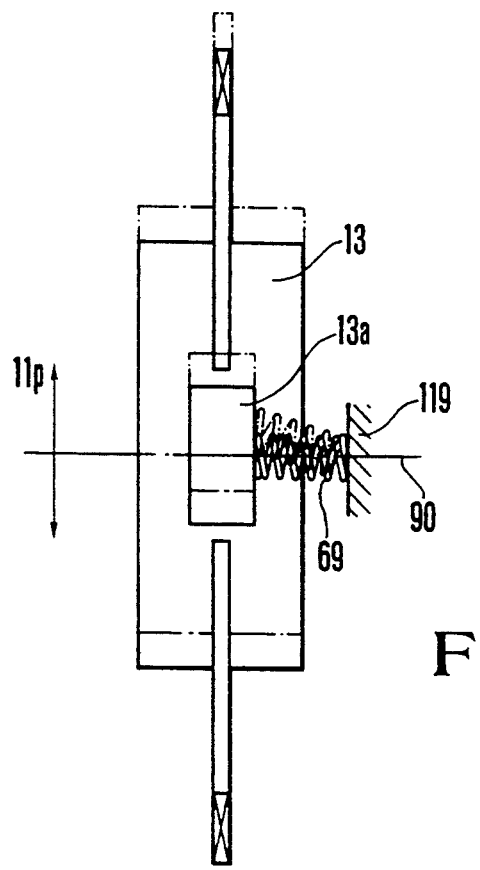
FIGS. 15(a) and 15(b) show in a side view and a top view the essential parts of the correcting optical mechanism of FIG. 1 arranged as a further embodiment of the invention.
Figure 15B:
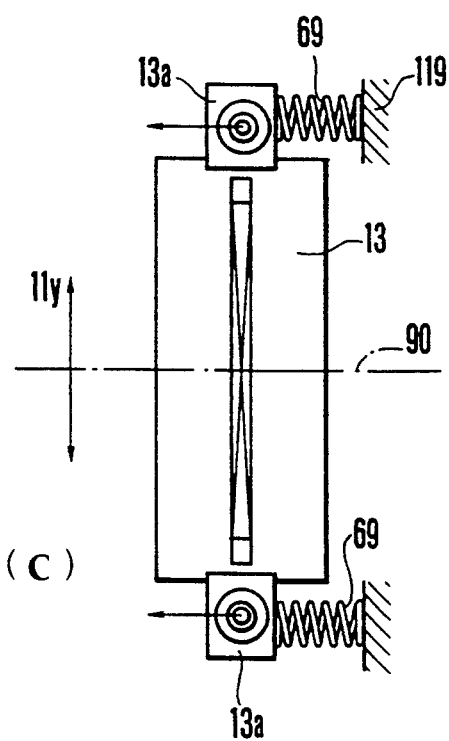
Figure 15C:
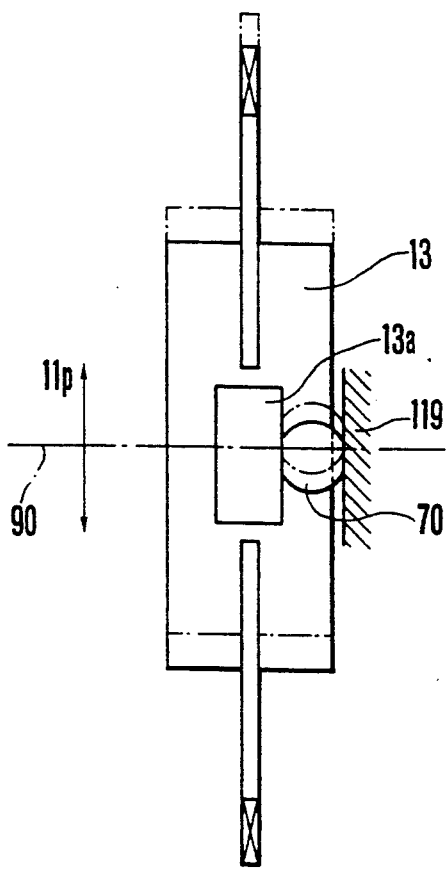
FIG. 15(c) is a side view showing by way of example a modification of the same embodiment shown in FIGS. 15(a) and 15(b).

FIGS. 15(a), 15(b) and 15(c) shows the correcting optical mechanism as being arranged as a further embodiment of the invention. A difference of this embodiment from the embodiments shown in FIGS. 12(a) and 12(b) and FIG. 14 is described as follows:

The embodiments shown in FIGS. 12(a) and 12(b) and FIG. 14 are arranged to impart pressure between the stationary frame 13 and the first holding frame 16 and between the first holding frame 16 and the second holding frame 119. In the case of this embodiment, however, the pressure is imparted between the stationary frame 13 and the second holding frame 119 or a lens barrel part to which the second holding frame 119 is secured. FIGS. 15(a) and 15(b) show this arrangement in a side view and a top view. As shown, pressurizing coil springs 69 which impart pressure in the direction of an optical axis 90 are interposed in between the second holding frame 119 and the boss parts 13a of the stationary frame 13. The pressurizing coil springs 69 are flexible in the pitch direction 11p and the yaw direction 11y. The stationary frame 13 is arranged to be movable in the pitch direction 11p as indicated by broken lines in FIG. 15(a). The stationary frame 13 is movable also in the yaw direction 11y.

The pressurizing (or pressure imparting) coil spring 69 is arranged to impart pressure to a part between the pitch shaft 15p and the bearing 14p (see FIG. 13) to facilitate driving. The spring 69 imparts pressure also between the yaw shaft 15y and the bearing 14y to give the same effect, because while the pressurizing coil spring 69 causes the pitch shaft 15p to be pushed toward the optical axis by the second holding frame 119 through the bearing 14p, the first holding frame 16 is pushed by the second holding frame 119 as the yaw shaft 15y is mounted on the first holding frame 16. This brings about the same condition as the pressurizing condition obtained between the yaw shaft 15y and the bearing 14y in the cases of FIGS. 12(a) and 12(b) to 14. The arrangement permits reduction in size of the pressure imparting spring, so that the embodiment can be arranged in a smaller size than the embodiments shown in FIGS. 12(a) and 12(b), and FIG. 14. Further, with the stationary frame 13 being arranged to be pressed toward the second holding frame 119, the following advantage accrues from this as mentioned in the foregoing, there is a clearance between the pitch shaft 15p and the bearing 14p. Therefore, the stationary frame 13 has some play also in the direction of the optical axis 90. However, this play is removed as the stationary frame 13 is pressed by the second holding frame 119 toward the optical axis 90 as shown in FIGS. 15(a) and 15(b). This effectively prevents any image deterioration that results from the play otherwise existing in the optical axis direction.

In the case of FIGS. 15(a) and 15(b), the coil spring 69 is employed as pressure imparting means. However, the same advantageous effect is attainable by interposing in between the stationary frame 13 and the second holding frame 119 an elastic ball which is rollable in the pitch and yaw direction 11p and 11y as shown in FIG. 15(c). Further, the pressure imparting means may be replaced with magnetic means such as a permanent magnet, an electromagnet, or the like.

Figure 16:
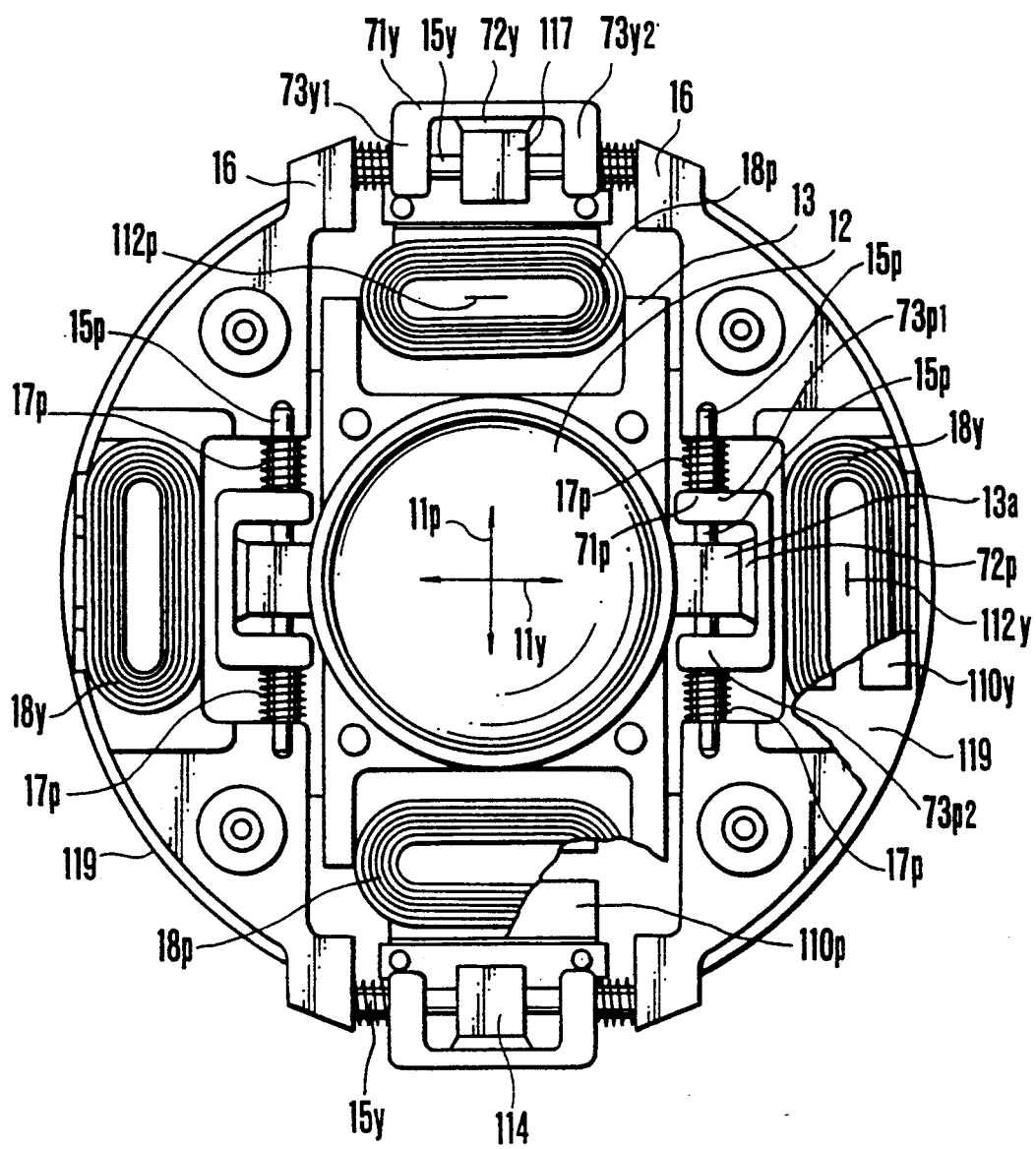
FIG. 16 is a plan view showing the correcting optical mechanism of FIG. 1 arranged as a further embodiment of the invention.

FIG. 16 shows the correcting optical mechanism of FIG. 1 as being arranged as a further embodiment of the invention. The driving action is smoothened by the pressure imparting means in the case of each of the embodiments shown in FIGS. 12(a) and 12(b) to 15. However, the pressure imparting means requires large driving forces in the pitch and yaw directions 11p and 11y, because it has resilience also in these directions. In view of this problem, the embodiment shown in FIG. 16 is arranged to use pressure imparting means which has no resilience in the pitch and yaw directions 11p and 11y.

Referring to FIG. 16, a pitch pressurizing case 71p is mounted via an elastic rubber piece 72p on each of the boss parts 13a of the stationary frame 13. Bearings are provided at both ends 73p1 and 73p2 of the pitch pressurizing case 71p. The case 71p is thus arranged to be slidable over the pitch shaft 15p.

Figure 17:
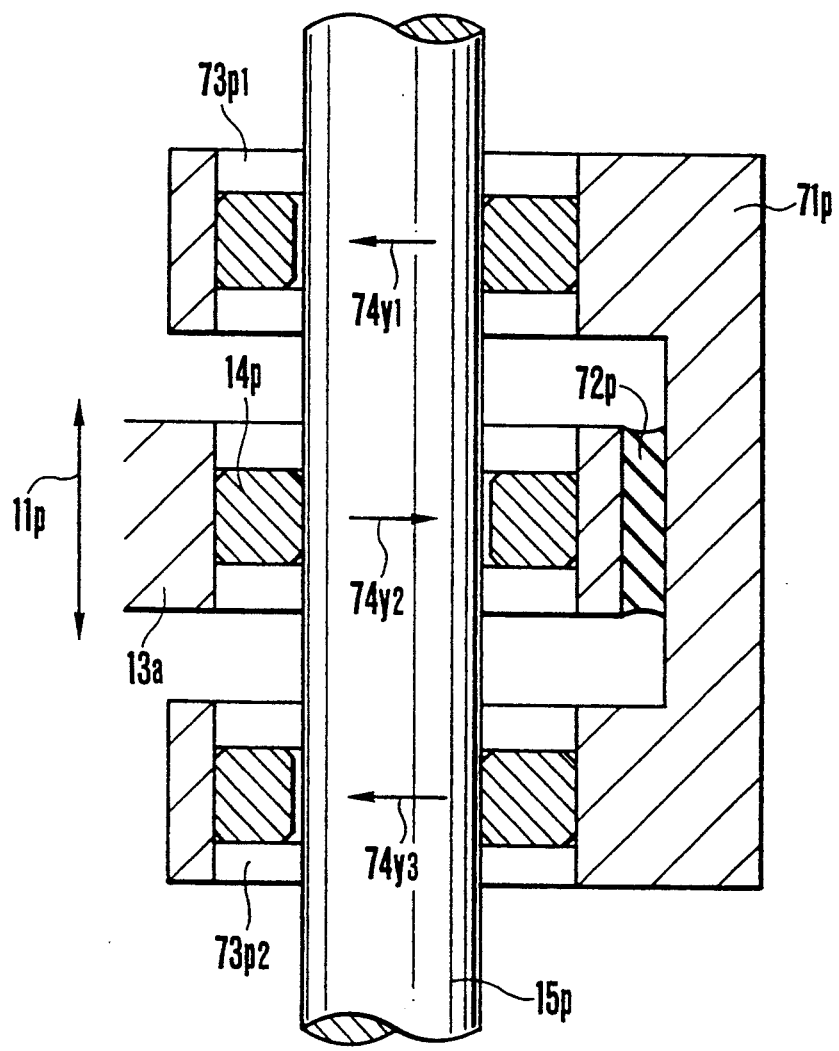
FIG. 17 is a sectional view showing the essential parts of FIG. 16.

The elastic rubber piece 72p pulls the boss part 13a and the pitch pressurizing case 71p relative to each other. This causes the bearings to be pressed in the directions of arrows 74y1, 74y2 and 74y3 as shown in FIG. 17 in such a way as to permit smooth driving. Since the pressure imparting means has no resilience in the pitch direction 11p as mentioned above, the driving force in this direction does not have to be increased.

In the yaw direction 11y, a yaw pressurizing case 71y is likewise mounted via an elastic rubber piece 72y on the housing 117 to give the same advantageous effect.

In this case, the elastic rubber piece 72p is arranged to pull the boss part 13a and the pitch pressurizing case 71p as mentioned above. However, the arrangement of course may be changed to insert a compressed rubber piece in between them to cause the boss part 13a and the pitch pressurizing case 71p to repel each other.

Figure 18:
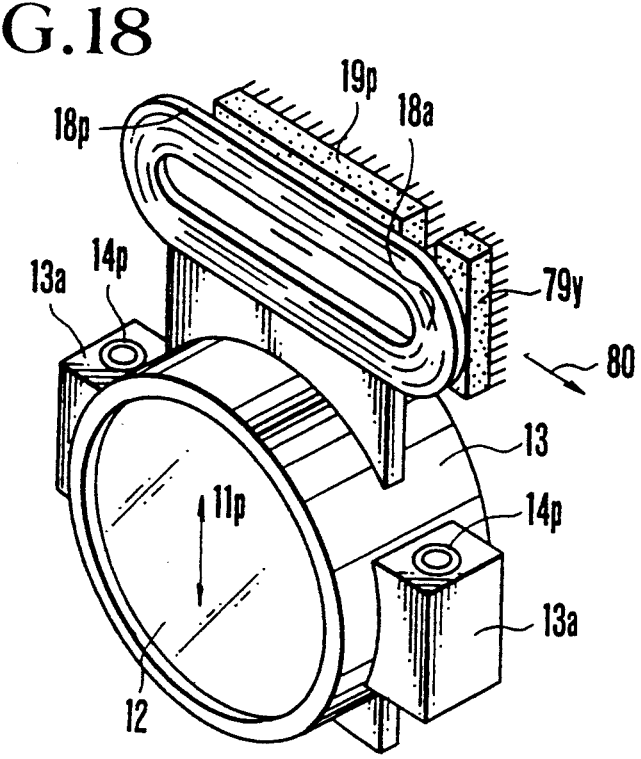
FIG. 18 is an oblique view showing the correcting optical mechanism of FIG. 1 arranged as a further embodiment of the invention.

FIG. 18 shows the correcting optical mechanism of FIG. 1 as being arranged as a further embodiment of the invention. In this case, the driving means for driving the correcting optical system 12 is arranged to serve also as pressure imparting means. The arrangement permits further reduction in size and weight.

The embodiment shown in FIG. 18 differs from the embodiments of FIGS. 2(a) and 2(b) and FIGS. 3(a) and 3(b) in the following point: a yaw driving magnet 79y is mounted next to a permanent magnet 19p which is opposed to the pitch coil 18p. In the same manner as this, a pitch driving magnet 79p (not shown) is mounted next to a permanent magnet 19y which is opposed to the yaw coil 18y.

When the stationary frame 13 is driven in the pitch direction 11p, therefore, a force is applied in the yaw direction 11y to its side opposed to the yaw driving magnet 79y, because the end part 18a of the yaw driving magnet confronting side of the pitch coil 18p includes a winding part in parallel to the pitch direction 11p and, when a current flows there, a force is generated in the yaw direction 11y by the left-hand rule of Fleming.

However, since the first holding frame 16 tends to be kept in a neutral position in the yaw direction 11y by the action of the yaw coil spring 17y, pressure arises between the pitch shaft 15p and the bearing 14p to permit smooth driving.

In the same manner as this, when the first holding frame 16 is driven in the yaw direction 11y, a relation between the pitch driving magnet 79p and the yaw coil 18y brings about pressure in the pitch direction 11p in such a way as to allow smooth sliding between the yaw shaft 15y and the bearing 14y.

Figure 19A:
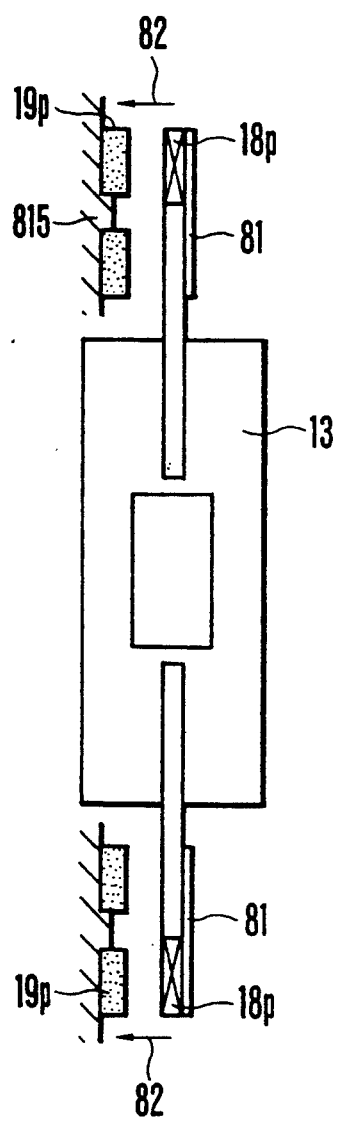
FIGS. 19(a) and 19(b) are side views showing by way of example a modification of the embodiment shown in FIG. 18.

FIG. 19(a) shows an arrangement which differs from the embodiments of FIGS. 2(a) and 2(b) and FIGS. 3(a) and 3(b) in that a magnetic member 81 is mounted on the pitch coil 18p. The magnetic member 81 is arranged to give pressure by being pulled by a permanent magnet 19p in the direction of arrow 82. Therefore, like in the case of FIG. 15, pressure is applied to the pitch shaft 15p and the bearing 14p and also to the yaw shaft 15y and the bearing 14y. The arrangement of the example shown in FIG. 19(a) may be changed to a so-called movable magnet type by mounting the pitch coil 18p on the second holding frame 119 and the permanent magnet 19p on the stationary frame 13.

Figure 19B:
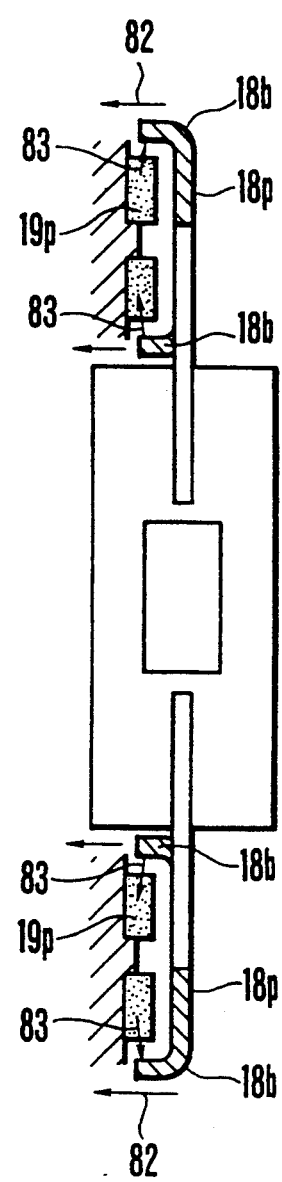

FIG. 19(b) shows another arrangement as a further embodiment of the invention, wherein the pitch coil 18p is arranged to encompass the permanent magnet 19p by bending the two ends of the pitch coil 18p in a manner as indicated by parts 18b in the drawing. This causes the permanent magnet 19p to have its magnetic flux leak also in the direction of arrow 83. Therefore, when a current is allowed to flow to the pitch coil 18p in driving in the pitch direction 11p, a force is generated also in the direction of arrow 82. As a result pressure develops between the pitch shaft and the bearing.

Figure 20:
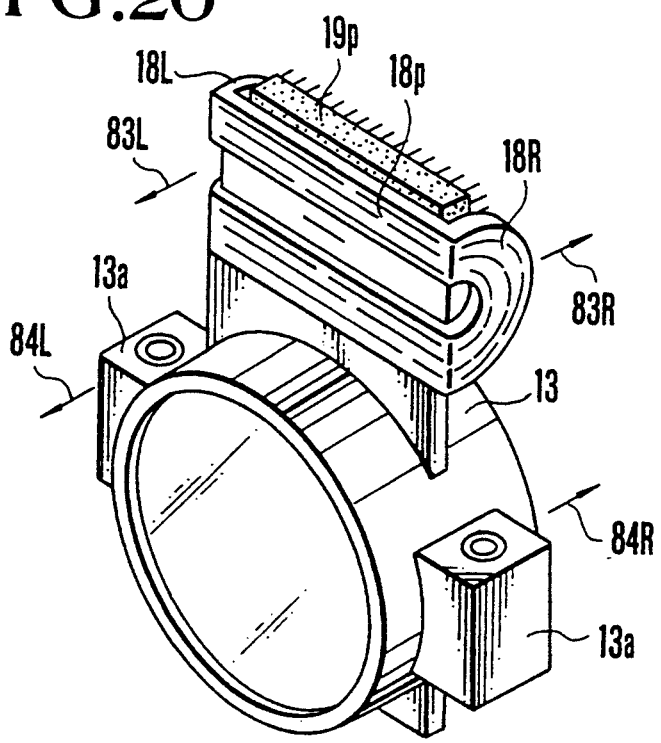
FIG. 20 is an oblique view showing the correcting optical mechanism of FIG. 1 arranged as a further embodiment of the invention.

FIG. 20 shows a different arrangement as a further embodiment of the invention. In this case, the end parts 18R and 18L of the pitch coil 18p are arranged to encompass the permanent magnet 19p in a manner as shown in the drawing. When a current is applied to the pitch coil 18p, forces are generated in the directions of arrows 83R and 83L. As a result, the boss part 13a is pressed in the directions of arrows 84R and 84L to bring about pressure between the pitch shaft 15p and the bearing 14p.

Figure 21:
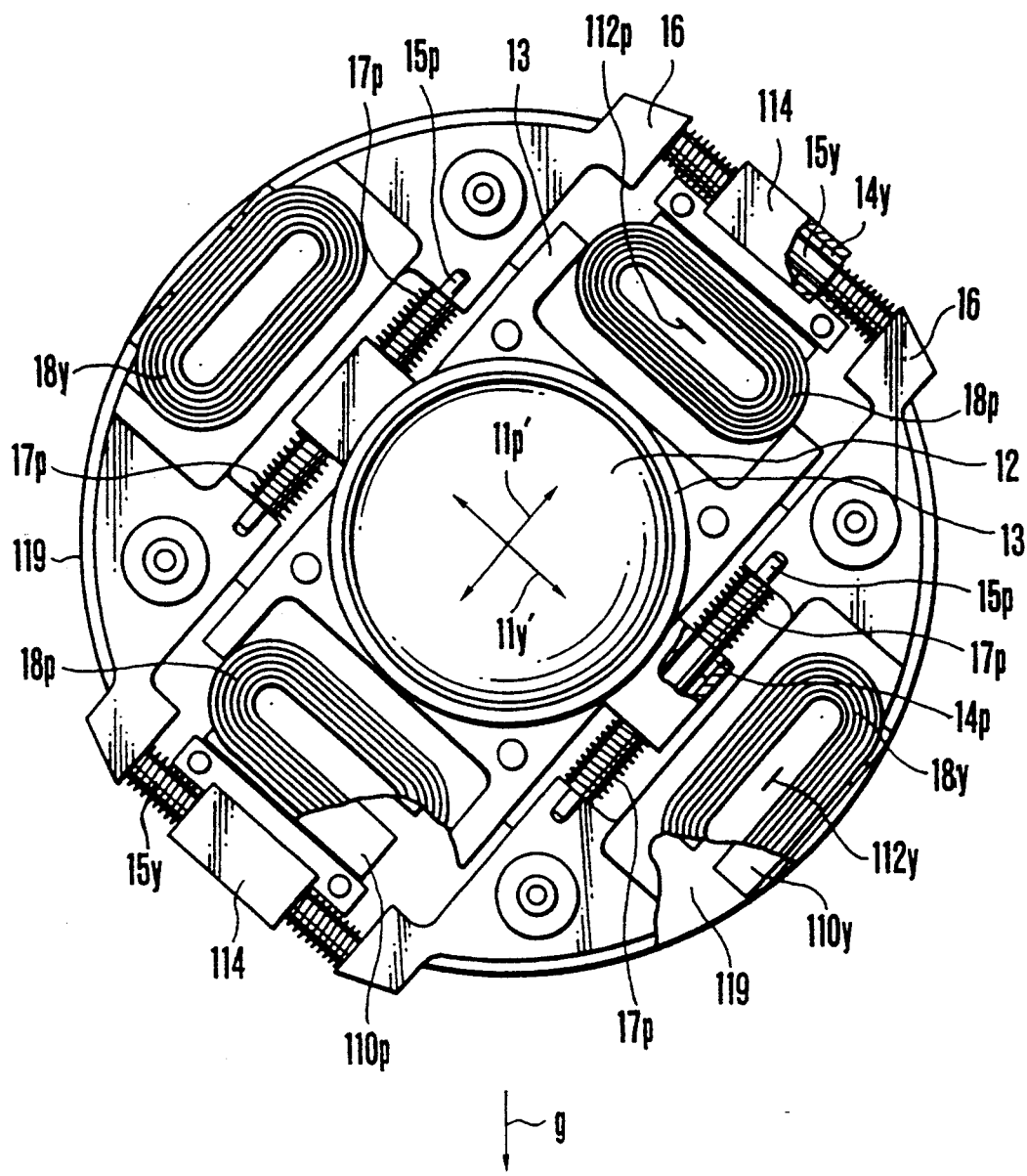
FIG. 21 is a plan view showing the correcting optical mechanism of FIG. 1 arranged as a further embodiment of the invention.

FIG. 21 shows the correcting optical mechanism of FIG. 1 as being arranged as a further embodiment of the invention. In this case, the second holding frame 119 is mounted on the lens barrel in such a way as to have both the pitch shaft 15p and the yaw shaft 15y not in parallel to the direction of gravity "g". This causes a force to be exerted on the stationary frame 13 in the direction of gravity by the mass of the correcting optical system 12, etc. As a result, pressure is brought about between the pitch shaft 15p and the bearing 14p and between the yaw shaft 15y and the bearing 14y to prevent any twist between them to ensure smooth driving.

In this instance, the driving directions 11p' and 11y' in which the correcting optical system 12 is driven are of course at some angle with the pitch direction 11p and the yaw direction 11y respectively. This problem can be solved, for example, by composing and computing the signals of the integrators 35p and 35y shown in FIG. 1 in such a way as to correct this angle. Further, it is also possible to mount the angular velocity meters 33p and 33y in such a manner as to have their sensitivity axes 34p and 34y in parallel to the driving directions 11p' and 11y'.

The arrangement to use the gravity as the pressure imparting means, as in the case of the embodiment of FIG. 21, dispenses with any special arrangement and obviates the necessity of increasing the driving force.

In each of the embodiments shown in FIGS. 12(a) and 12(b) to 21, the pressure is imparted either constantly or in driving. Whereas, in the case of an embodiment shown in FIG. 22, the driving action is smoothened by imparting pressure only in the event of occurrence of twisting or the like.

Figure 22:
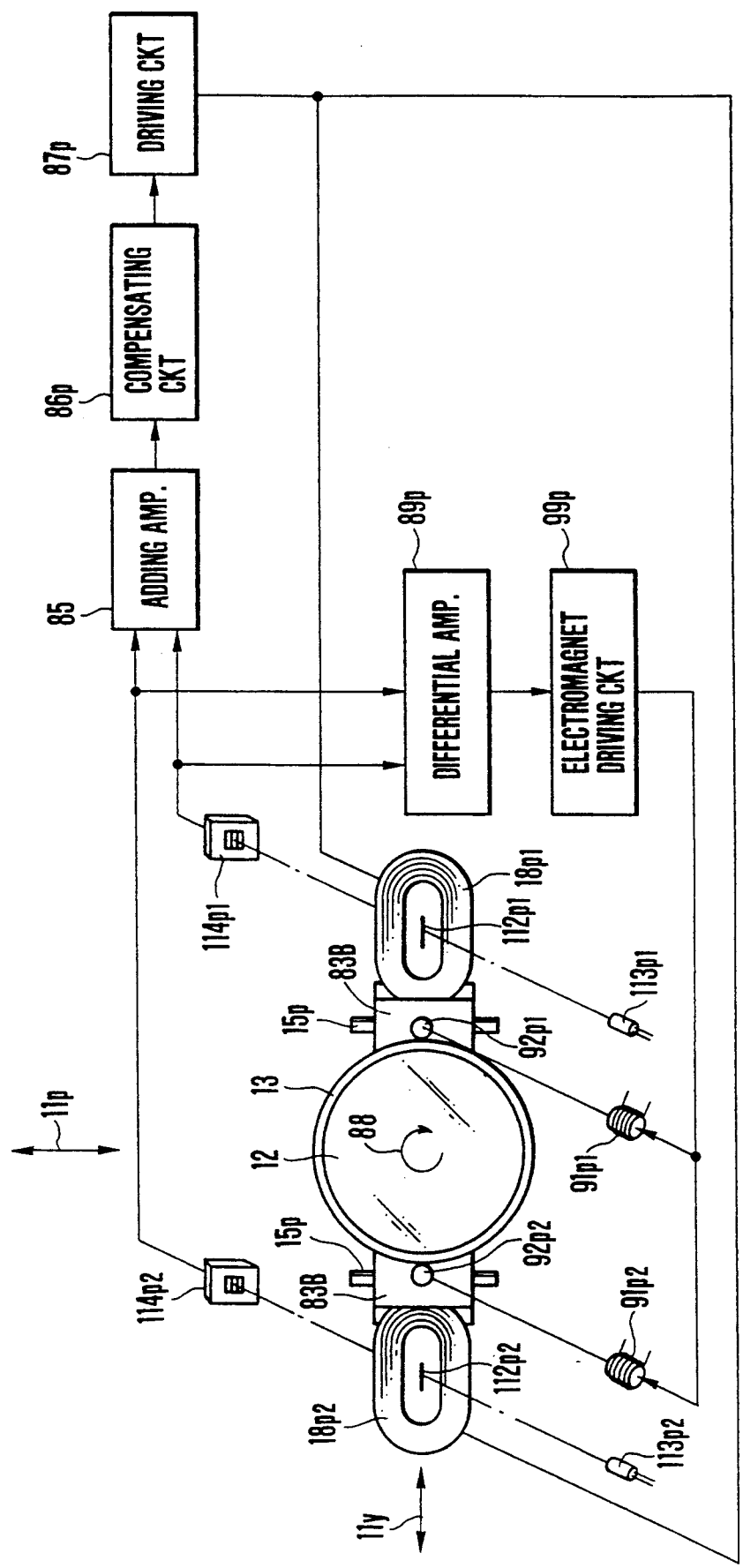
FIG. 22 shows in outline the correcting optical mechanism of FIG. 1 arranged as a further embodiment of the invention.
Figure 24:
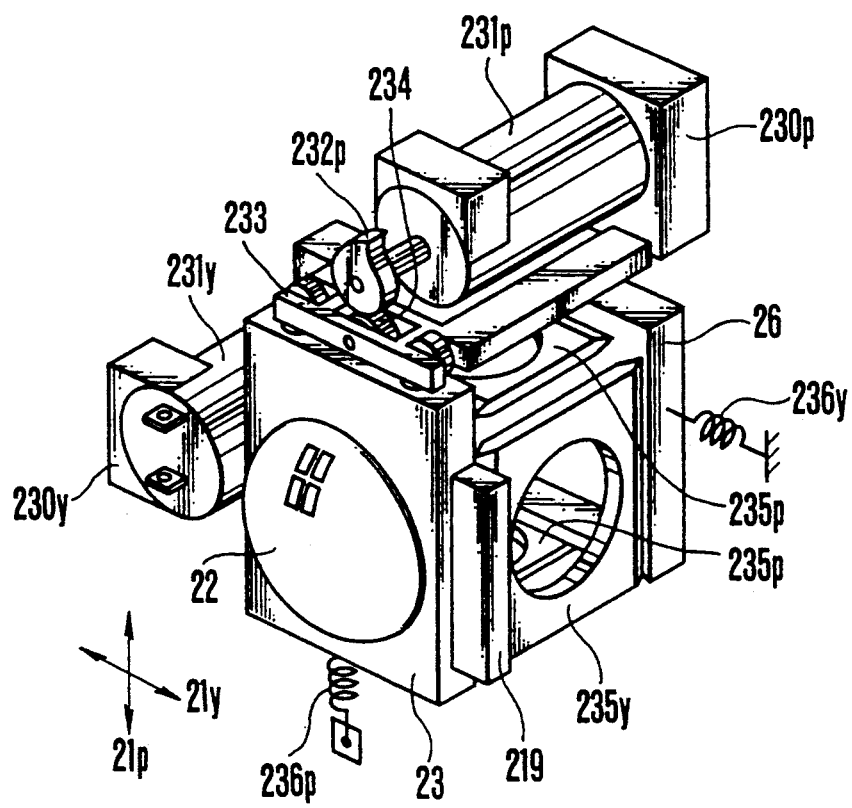
FIG. 24 is an oblique view showing the conventional correcting optical mechanism.

Referring to FIG. 22, pitch coils 18p1 and 18p2 are arranged side by side in the yaw direction 11y. Both the pitch coils 18p1 and 18p2 are provided with slits 112p1 and 112p2. The positions of these pitch coils are detected through these slits by means of light projectors 113p1 and 113p2 and light receivers 114p1 and 114p2.

The outputs of the light receivers 114p1 and 114p2 are added together and amplified by an adding amplifier 85. A compensating circuit 86p and a driving circuit 87p form a control driving loop.

The stationary frame 13 rotates around the optical axis (in the direction of arrow 88) upon occurrence of a twist. This rotation is detected by a differential amplifier 89p. In response to the output of the amplifier 89p, electromagnets 91p1 and 91p2 are driven by an electromagnet driving circuit 99p. Magnetic targets 91p1 and 91p2 which are mounted on the boss parts 13a are pulled to impart pressure. When driving is normalized by the pressure, the pressure imparting action is brought to a stop.

Since the pressure is not normally imparted in accordance with this arrangement, the embodiment does not require a large driving force and is capable of imparting a degree of pressure apposite to the degree of twist upon occurrence of twisting.

FIG. 23 shows the correcting optical mechanism of FIG. 1 as being arranged as a still further embodiment of the invention. The embodiment is arranged to detect twisting by utilizing the fact that a large driving force is generated always when twisting occurs in driving the stationary frame 13 in the pitch direction 11p; and to impart pressure to the driving action to smoothen it upon detection of twisting in this manner. This embodiment comprises a control driving loop including a light receiver 114p, an amplifier 46p, a compensating circuit 47p and a driving circuit 48p; an integrator 92p which is arranged to integrate the signal of the driving circuit 48p; a constant signal generator 93p; a comparator 94p which is arranged to produce an output when the output of the integrator 92p becomes larger than the output of the constant signal generator 93p; and an analog switch 96p which is arranged to connect an electromagnet driving circuit 95p to an electromagnet 97p according to the output of the comparator 94p.

When the output of the driving circuit 48p is caused to become large and to last for a long period by occurrence of twisting, the output of the integrator 92p becomes large. This causes the electromagnet 97p to be driven. The magnetic target 98p which is mounted on the boss part 13a is then pulled by the electromagnet 97p to bring about the pressure to be imparted. Since the embodiment is arranged to generate the imparting pressure only upon occurrence of twisting, the driving force is not normally increased by the pressure imparting action.

Each of the embodiments shown in FIGS. 12(a) and 12(b) to 23 is arranged to have the pressure imparting means between the shaft and the bearing. Therefore, according to the results of tests, the embodiment not only ensured smooth driving, thus effectively preventing the bearing from being damaged but also prevented such image deterioration that otherwise results from play between the shaft and the bearing. Further, the arrangement to have the driving means serve also as the pressure imparting means allowed curtailment of the number of parts required for the pressure imparting means. Further, the circuit arrangement to generate the imparting pressure only in the event of occurrence of twisting prevented the normal driving force from being increased by pressure impartment.

While the stationary frame to which the correcting optical system is secured is arranged to be secured to the bearing member in each of the embodiments described, the stationary frame may be arranged to be secured to the shaft. In that case, the bearing member is mounted either on the second holding frame or on a stationary member such as the lens barrel.

Further, this invention is applied to the image shake suppressing system of a camera of the kind using the angular velocity meters in the case of each of the embodiments described in the foregoing. However, it goes without saying that the invention is applicable to any image shake suppressing system as long as the system includes a correcting optical system for suppressing image shakes.

The embodiments described are capable of causing the image shake suppressing optical system to speedily follow image shakes without necessitating an increase in cost and without requiring a large space. The image shake suppressing device according to this invention has excellent responsivity to a wide range of vibrations from low-frequency vibrations to high-frequency vibrations. This invention has a very high degree of utility.

What is claimed is:

1. An image shake suppressing device for a camera, comprising:
    a) an image shake suppressing optical system;
    b) first guide means for guiding said image shake suppressing optical system to be movable in a first direction within a plane perpendicular to an optical axis;
    c) second guide means for guiding said image shake suppressing optical system to be movable in a second direction within the plane perpendicular to the optical axis; and
    d) driving means arranged to exert a magnetic driving force on said image shake suppressing optical system either in said first or second direction and thus to cause said image shake suppressing optical system to be moved according to a guiding action of said first or second guide means, said driving means including a first element arranged to generate said driving force, which generates a magnetic flux at least in response to an applied electrical current, and a second element which generates at all times a magnetic flux, with one of said elements being fixed to said optical system and the other being fixed to a predetermined position.

2. A device according to claim 1, wherein said image shake suppressing optical system includes a photo-taking optical system.

3. A device according to claim 1, further comprising means for urging said image shake suppressing optical system in an optical axis direction of said optical system.

4. A camera having a picture image shake suppressing device comprising:
    a) an image shake suppressing optical system;
    b) first guide means for guiding said image shake suppressing optical system to be movable in a first direction within a plane perpendicular to an optical axis;
    c) second guide means for guiding said image shake suppressing optical system to be movable in a second direction within the plane perpendicular to the optical axis; and
    d) driving means arranged to exert a magnetic driving force on said image shake suppressing optical system either in said first or second direction and thus to cause said image shake suppressing optical system to be moved according to a guiding action of said first or second guide means, said driving means including a first element arranged to generate said driving force, which generates a magnetic flux at least in response to an applied electrical current, and a second element which generates at all times a magnetic flux, with one of said elements being fixed to said optical system and the other being fixed to a predetermined position.

5. A camera according to claim 4, wherein said image shake suppression optical system includes a photo-taking optical system.

6. A camera according to claim 4, further comprising means for urging said picture image shake suppressing optical system in an optical axis direction of said optical system.

7. A device according to claim 1, wherein said first element includes a coil fixed on said optical system.

8. A device according to claim 1, wherein said driving means further comprising a yoke arranged to pass through both magnetic fluxes from said first and second elements.

9. A device according to claim 8, wherein said second element includes a permanent magnet.

10. A camera according to claim 6, wherein said urging means includes a spring functionally contacted with said optical system.

11. An image change suppressing device for an optical system, comprising:
    a) an image change suppressing optical system;
    b) guide means for guiding said image change suppressing optical system to be movable in predetermined direction within a plane perpendicular to an optical axis; and
    c) driving means arranged to exert a magnetic driving force on said image change suppressing optical system in said predetermined direction and thus to cause said image change suppressing optical system to be moved according to a guiding action of said guide means, said driving means including a first element arranged to generate said driving force, which generates a magnetic flux at least in response to an applied electrical current, and a second element which generates at all times a magnetic flux, with one of said elements being fixed to said optical system and the other being fixed to a predetermined position.

12. A device according to claim 11, wherein said first element includes a coil responsive to said electrical current and fixed on said optical system.

* * * * *